US010117220B2

(12) United States Patent
Wang et al.

(10) Patent No.: US 10,117,220 B2
(45) Date of Patent: Oct. 30, 2018

(54) METHOD AND APPARATUS FOR TRIGGERING MACHINE TYPE COMMUNICATIONS APPLICATIONS

(71) Applicant: InterDigital Patent Holdings, Inc., Wilmington, DE (US)

(72) Inventors: Peter S. Wang, E. Setauket, NY (US); Ulises Olvera-Hernandez, London (GB); Behrouz Aghili, Commack, NY (US); Pascal M. Adjakple, Great Neck, NY (US); Kai Liu, Dublin, OH (US); Mahmoud Watfa, Saint Leonard (CA); Saad Ahmad, Montreal (CA); Samian Kaur, Plymouth Meeting, PA (US); Guanzhou Wang, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/601,618

(22) Filed: May 22, 2017

(65) Prior Publication Data
US 2017/0257843 A1    Sep. 7, 2017

Related U.S. Application Data

(63) Continuation of application No. 14/864,132, filed on Sep. 24, 2015, now abandoned, which is a
(Continued)

(51) Int. Cl.
*H04W 68/00* (2009.01)
*H04W 76/04* (2009.01)
(Continued)

(52) U.S. Cl.
CPC ......... *H04W 68/005* (2013.01); *H04W 4/005* (2013.01); *H04W 4/06* (2013.01);
(Continued)

(58) Field of Classification Search
CPC .......... H04W 72/0446; H04W 72/048; H04W 76/27; H04W 76/046; H04W 4/70; H04W 4/06; H04W 84/02; H04W 68/02
See application file for complete search history.

(56) References Cited

U.S. PATENT DOCUMENTS

2006/0034278 A1    2/2006  Hundscheidt et al.
2008/0200146 A1*   8/2008  Wang ................... H04J 11/0069
                                                         455/410

(Continued)

FOREIGN PATENT DOCUMENTS

CN    102123135 A    7/2011
CN    102202270 A    9/2011

OTHER PUBLICATIONS

"Stage 3 for System Improvements to Machine-Type Communications," 3GPP TSG CT #53, CP-110728, Fukoka, Japan (Sep. 14-16, 2011).

(Continued)

*Primary Examiner* — Afsar M Qureshi
(74) *Attorney, Agent, or Firm* — Volpe and Koenig, P.C.

(57) ABSTRACT

A method and apparatus for machine type communication (MTC) authentication and triggering may be performed by an MTC interworking function (MTC-IWF). On a condition an Internet protocol (IP) connection does not exist between a services capability server (SCS) and an MTC device, a device trigger message may be received by the MTC device over a Tsp interface. The device trigger message may include a cryptographic key and may have an associated level of urgency. The method may further comprise determining a level of network congestion and transmitting the device trigger, including the received cryptographic key, to the MTC device in accordance with the associated level of urgency. A report may be sent to the SCS, associated with the determined level of network congestion, to indicate either
(Continued)

success or failure of the device triggering procedure. The received cryptographic key may be used to secure an IP connection.

20 Claims, 14 Drawing Sheets

Related U.S. Application Data continuation of application No. 14/475,116, filed on Sep. 2, 2014, now Pat. No. 9,148,748, which is a continuation of application No. 13/715,685, filed on Dec. 14, 2012, now abandoned.

(60) Provisional application No. 61/590,941, filed on Jan. 26, 2012, provisional application No. 61/570,682, filed on Dec. 14, 2011.

(51) Int. Cl.
*H04W 4/00* (2018.01)
*H04W 72/04* (2009.01)
*H04W 4/06* (2009.01)
*H04W 68/02* (2009.01)
*H04W 4/70* (2018.01)
*H04W 76/27* (2018.01)
*H04W 84/02* (2009.01)

(52) U.S. Cl.
CPC ............ *H04W 4/70* (2018.02); *H04W 68/02* (2013.01); *H04W 72/048* (2013.01); *H04W 72/0446* (2013.01); *H04W 76/046* (2013.01); *H04W 76/27* (2018.02); *H04W 84/02* (2013.01)

(56) References Cited

U.S. PATENT DOCUMENTS

| | | |
|---|---|---|
| 2011/0002281 A1 | 1/2011 | Terry et al. |
| 2011/0199905 A1 | 8/2011 | Pinheiro et al. |
| 2012/0040700 A1* | 2/2012 | Gomes ............... H04W 4/08 455/500 |
| 2012/0106431 A1 | 5/2012 | Wu et al. |
| 2012/0202543 A1* | 8/2012 | Murias ............... H04W 4/70 455/509 |
| 2012/0204094 A1* | 8/2012 | Liang ............... G06F 11/3495 715/234 |
| 2012/0207094 A1 | 8/2012 | Liao |
| 2012/0224477 A1* | 9/2012 | Balasubramanian ................. H04L 45/125 370/230 |
| 2012/0252518 A1 | 10/2012 | Karampatsis et al. |
| 2013/0013792 A1 | 1/2013 | Norp |
| 2013/0019042 A1 | 1/2013 | Ertugay et al. |
| 2013/0034059 A1 | 2/2013 | Lee et al. |
| 2013/0115993 A1* | 5/2013 | Jain ............... H04W 76/02 455/517 |
| 2013/0155948 A1 | 6/2013 | Pinheiro et al. |
| 2013/0308564 A1* | 11/2013 | Jain ............... H04B 15/00 370/329 |
| 2012/0336305 | 12/2013 | Yan et al. |
| 2013/0336305 A1* | 12/2013 | Yan ............... H04B 7/024 370/338 |
| 2013/0336306 A1 | 12/2013 | Sohn et al. |
| 2014/0050147 A1 | 2/2014 | Beale |
| 2014/0056222 A1 | 2/2014 | Zhu et al. |

OTHER PUBLICATIONS

Alcatel-Lucent, "Additional condition for attach exceptions," 3GPP TSG-CT WG1 Meeting #79, C1-123448, Chicago (USA) (Aug. 6-10, 2012).

Catt et al.,"Transfer Solution from TR23.888 section 6.52.2.7 into TR23.887 with some modifications," SA WG2 Meeting #92, S2-123415, Barcelona, Spain (Jul. 9-13, 2012).
Hitachi et al., "Using cell broadcast for device triggering," SA WG2 Meeting #87, S2-114069 (Oct. 10- 14, 2011).
HTC et al., "Solution of overload handling for device triggering," SA WG2 Meeting #92, S2-123413, Barcelona, Spain (Jul. 9-13, 2012).
Huawei et al., "Correction on NAS signalling low priority overriding handling," 3GPP TSG-CT WG1 Meeting #79 , C1-123020, Chicago (USA) (Aug. 6-10, 2012).
Huawei et al., "Handling of PDN connection for dual-priority functionality," 3GPP TSG-CT WG1 Meeting #79 , C1-123451, Chicago (USA) (Aug. 6-10, 2012).
Huawei et al., "Handling of PDN connection for dual-priority functionality," 3GPP TSG-CT WG1 Meeting #79 , C1-123450, Chicago (USA) (Aug. 6-10, 2012).
KPN,"Revised WID: Security Aspects of System Improvements for Machine Type Communication (SIMTC)," 3GPP TSG SA Meeting #53, SP-110499, Fukoka, Japan (Sep. 19-21, 2011).
Nokia Siemens Networks et al., "Solution for T5 based device triggering," SA WG2 Meeting #92, S2-123412 Barcelona, Spain (Jul. 9-13, 2012).
Panasonic, "Access restriction control for MTC Groups," 3GPP TSG SA WG2 Meeting #79E (Electronic), S2-103190 (Jul. 6-13, 2010).
SA WG2, "Reply LS on M2M Dual Priority," 3GPP TSG CT WG1 Meeting #78, C1-121931, Kyoto (Japan) (May 21-25, 2012).
Third Generation Partnership Project, "Technical Specification Group Services and System Aspects; Service requirements for Machine-Type Communications (MTC); Stage 1 (Release 10)," 3GPP TS 22.368 V10.5.0 (Jun. 2011).
Third Generation Partnership Project, "Technical Specification Group Services and System Aspects; Service requirements for Machine-Type Communications (MTC); Stage 1 (Release 11)," 3GPP TS 22.368 V11.3.0 (Sep. 2011).
Third Generation Partnership Project, "Technical Specification Group Services and System Aspects; Service requirements for Machine-Type Communications (MTC); Stage 1 (Release 11)," 3GPP TS 22.368 V11.6.0 (Sep. 2012).
Third Generation Partnership Project, "Technical Specification Group Services and System Aspects; Service requirements for Machine-Type Communications (MTC); Stage 1 (Release 12)," 3GPP TS 22.368 V12.0.0 (Sep. 2012).
Third Generation Partnership Project, "Technical Specification Group Services and System Aspects; System Improvements for Machine-Type Communications; (Release 11)," 3GPP TR 23.888 V1.2.0 (Apr. 2011).
Third Generation Partnership Project, "Technical Specification Group Services and System Aspects; System Improvements for Machine-Type Communications; (Release 11)," 3GPP TR 23.888 V1.6.0 (Nov. 2011).
Third Generation Partnership Project, "Technical Specification Group Services and System Aspects; System improvements for Machine-Type Communications (MTC) (Release 11)," 3GPP TR 23.888 V11.0.0 (Sep. 2012).
Third Generation Partnership Project, "Technical Specification Group Services and System Aspects; Machine-Type and other Mobile Data Applications Communications Enhancements (Release 12)," 3GPP TR 23.887 V0.5.0 (Nov. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.5.0 (Sep. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.9.0 (Dec. 2012).
Third Generation Partnership Project, "Technical Specification Group Services and System Aspects; General Packet Radio Service (GPRS)

(56) References Cited

OTHER PUBLICATIONS enhancements for Evolved Universal Terrestrial Radio Access Network (E-UTRAN) access (Release 11)," 3GPP TS 23.401 V11.3.0 (Sep. 2012).
Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.3.0 (Sep. 2011).
Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.6.0 (Jun. 2012).
Third Generation Partnership Project, "Technical Specification Group Radio Access Network; Evolved Universal Terrestrial Radio Access (E-UTRA); User Equipment (UE) procedures in idle mode (Release 11)," 3GPP TS 36.304 V11.1.0 (Sep. 2012).
Third Generation Partnership Project, "Technical Specification Group Services and System Aspects; Architecture enhancements to facilitate communications with packet data networks and applications (Release 11)," 3GPP TS 23.682 V11.2.0 (Sep. 2012).
Third Generation Partnership Project, "Technical Specification Group Core Network and Terminals; Tsp interface protocol between the MTC Interworking Function (MTC-IWF) and Service Capability Server (SCS) (Release 11)," 3GPP TS 29.368 V11.0.0 (Sep. 2012).

\* cited by examiner

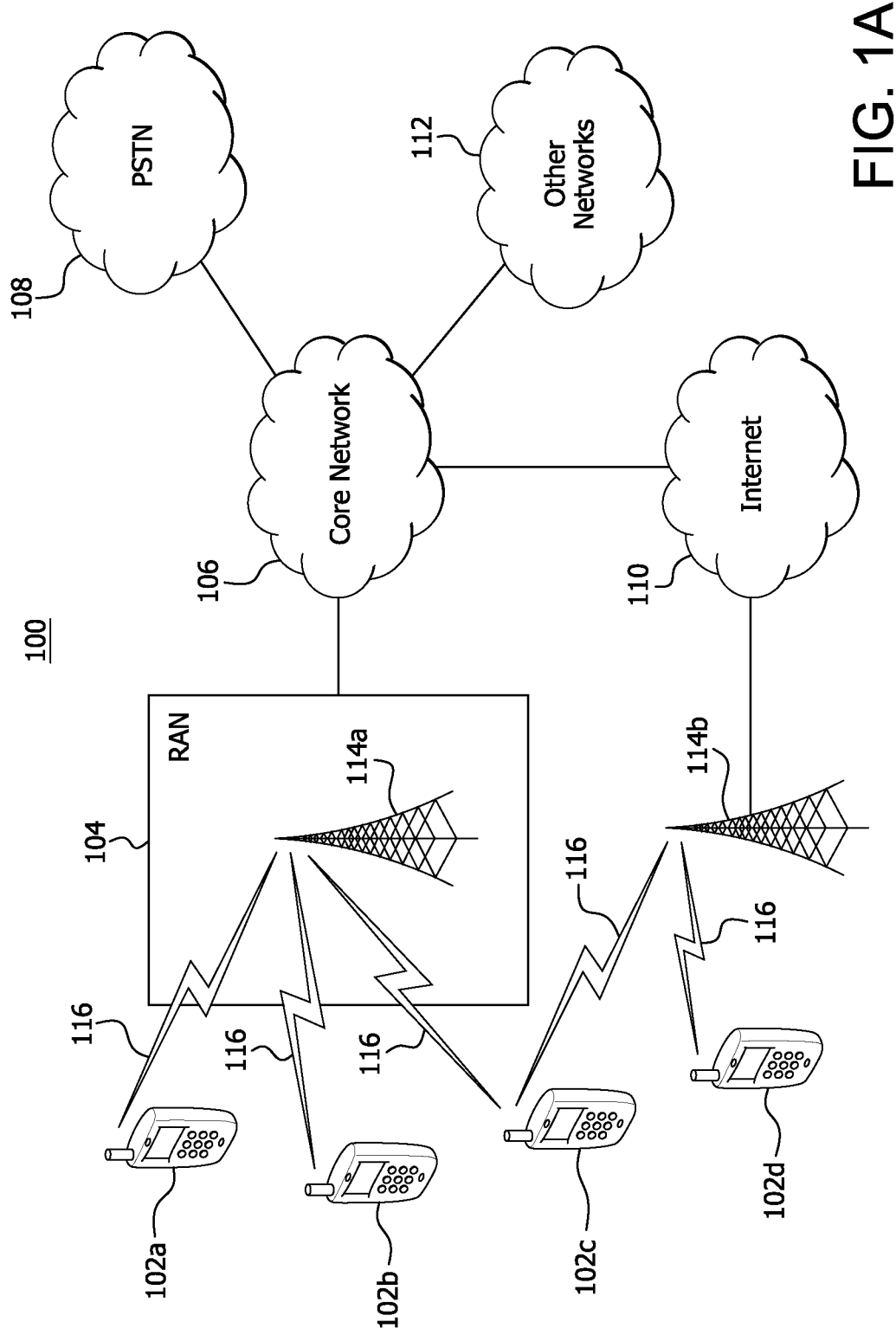

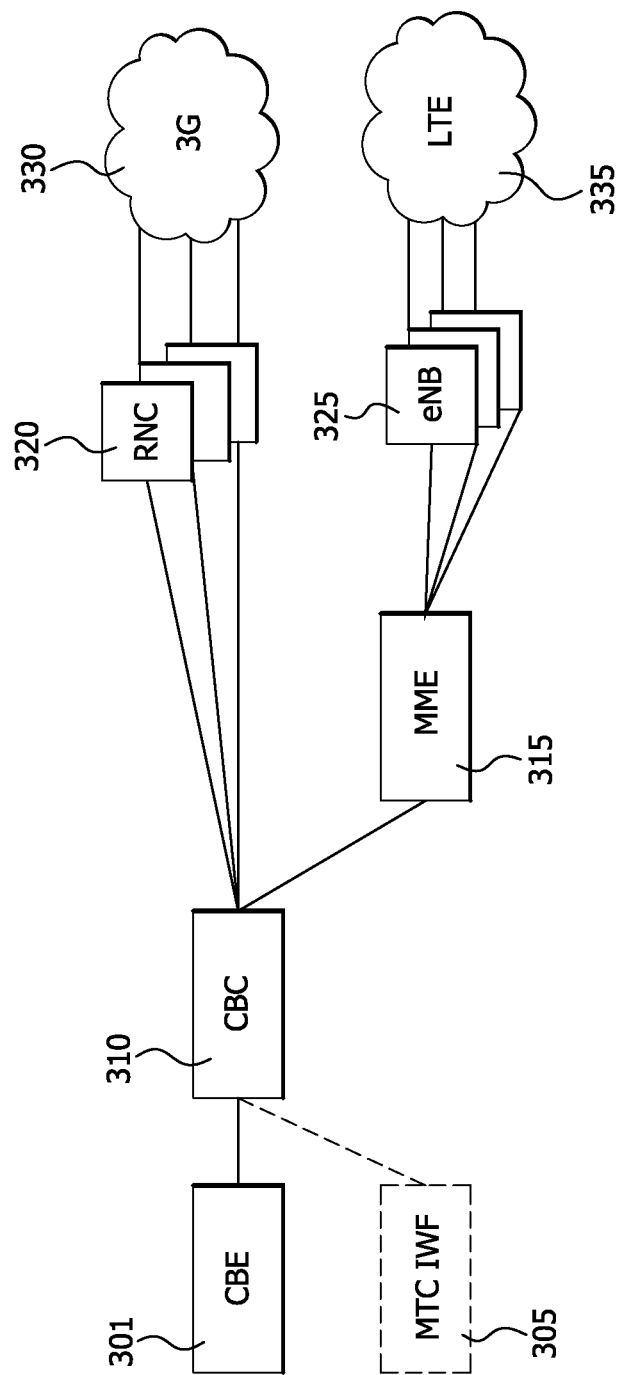

| IEI | Information Element | Type/Reference | Presence | Format | Length |
|---|---|---|---|---|---|
| | Protocol discriminator 410(a) | Protocol discriminator 9.2 | M | V | 1/2 |
| | Security header type 410(b) | Security header type 9.3.1 | M | V | 1/2 |
| | MTC Device Trigger Request 410(c) | Message type 9.8 | M | V | 1 |
| | MTC Device ID (or Group-Id) 410(d) | | | | |
| | Authorization or Security Code 410(e) | | | | |
| | MTC Device Trigger Request Type 410(f) | | | | |
| | Trigger Response Resource Type 410(g) | | | | |
| | Response-ID 410(h) | | | | |
| | Response Area Scope 410(i) | | | | |
| XX | MTC Specific Message 410(j) Container | Content to MTC application | | | |

FIG. 4

| IEI | Information Element | Type/Reference | Presence | Format | Length |
|---|---|---|---|---|---|
| | Protocol discriminator  510(a) | Protocol discriminator 9.2 | M | V | 1/2 |
| | Security header type  510(b) | Security header type 9.3.1 | M | V | 1/2 |
| | MTC Device Trigger Request  510(c) | Message type 9.8 | M | V | 1 |
| | Trigger Content Type  510(d) | | | | |
| | MTC Device ID (or Group-ID)  510(e) | | | | |
| | Authorization or Security Code  510(f) | | | | |
| | ... | | | | |
| XY | MTC SMS Container  510(j) | SMS content for MTC device triggering | | | |

FIG. 5

```
PagingUE-Identity ::=
    CHOICE {
        s-TMSI             S-TMSI,
        imsi               IMSI,
        MTC-ID-Info        MTC-Identity-Info
        ...
    }
```

FIG. 6

| Ns | PO when i_s=0 | PO when i_s=1 |
|---|---|---|
| 1 | 8 | N/A |
| 2 | 3 | 8 |

FIG. 7

```
Paging ::=             SEQUENCE {
    pagingRecordList           PagingRecordList       OPTIONAL,  -- Need ON
    systemInfoModification     ENUMERATED {true}      OPTIONAL,  -- Need ON
    etws-Indication            ENUMERATED {true}      OPTIONAL,  -- Need ON
    nonCriticalExtension       Paging-v890-IEs        OPTIONAL
}

Paging-v890-IEs ::=    SEQUENCE {
    lateNonCriticalExtension   OCTET STRING           OPTIONAL,  -- Need OP
    nonCriticalextension       Paging-v920-IEs        OPTIONAL
}

Paging-v920-IEs ::=    SEQUENCE {
    cmas-Indication-r9         ENUMERATED {true}      OPTIONAL,  -- Need ON
    nonCriticalExtension       Paging-vC00-IEs        OPTIONAL   -- Need OP
}

801  Paging-vC00-IEs ::= SEQUENCE {
    mtc-TriggerIndication-XX   ENUMERATED {true}      OPTIONAL,  -- Need ON
    nonCriticalExtension       SEQUENCE { }           OPTIONAL   -- Need OP
}
```

FIG. 8

```
MTCDeviceTrigger ::=
    MTCDeviceTriggerRecordList
    MTCGlobalAttributes
    nonCriticalExtension    SEQUENCE {
                                MTCDeviceRecordList         OPTIONAL,-- Need ON
                                ????                        OPTIONAL
                                MTCDeviceTrigger-vc00-IEs   OPTIONAL
                            }

MTCDeviceRecordList ::= SEQUENCE (SIZE (1..maxTriggerRec)) OF TriggerRecord

TriggerRecord ::= SEQUENCE {
    Device-Identity         TriggerDevice-Identity,
    TriggerCommand          TriggerCommand-IE
    cn-Domain               ENUMERATED {ps, cs},
    ...
}

TriggerDevice-Identity ::= CHOICE {
    Any form of MTC-ID          MTC-Identity
}                          ─── 905

TriggerCommand-IE ::= CHOICE {
    TriggerType             ...
    Response-format         ......
}
```

| IEI | Information Element | Type/Reference | Presence | Format | Length |
|---|---|---|---|---|---|
| | Protocol discriminator 1210(a) | Protocol discriminator | M | V | 1/2 |
| | MTC service message identity 1210(b) | Message type | M | V | 1 |
| | { necessary elements of Attach or extended Service Request...} | | | | |
| | [below are MTC trigger response elements] | | | | |
| | MTC Response type 1210(c) | Service type (MTC-ACK, MTC-NACK) | M | V | 1/2 |
| | MTC Trigger Response ID 1210(d) | Assigned by the trigger | | | |
| | MTC-Response details 1210(e) | String of Octets | O | | |
| | MTC-Cause 1210(f) | MTC-Cause Value | O | | |
| | Authentication response parameter 1210(g) | Authentication response parameter | O | | |

FIG. 14

| | | |
|---|---|---|
| 1405 | 000001 | The Requested Application does not exist |
| 1410 | 000010 | The Requested Application does not respond |
| 1415 | 000100 | Battery low |
| 1420 | 001000 | Not enough memory |
| 1425 | 010000 | Other |

| IEI | Information Element | Type/Reference | Presence | Format | Length |
|---|---|---|---|---|---|
| | Protocol discriminator 1310(a) | Protocol discriminator | M | V | 1/2 |
| | Security header type 1310(b) | Security header type | M | V | 1/2 |
| | Extended service request message identity 1310(c) | Message type | M | V | 1 |
| | Service type 1310(d) | Service type | M | V | 1/2 |
| | NAS key set identifier 1310(e) | NAS key set identifier | M | V | 1/2 |
| | M-TMSI 1310(f) | Mobile identity | M | LV | 6 |
| B- | CSFB response 1310(g) | CSFB response | C | TV | 1 |
| 57 | EPS bearer context status 1310(h) | EPS bearer context status | O | TLV | 4 |
| D- | Device properties 1310(i) | Device properties | O | TV | 1 |
| | EPS Bearer Type 1310(j) | Whether u-plane bearer is established to the WTRU | O | | |
| | MTC-Response-Type 1310(k) | MTC-Response Enum(ACK, NACK) | M | | |
| | MTC Trigger Response ID 1310(l) | | M | | |
| | MTC-Response Details 1310(m) | String of Octets for MTC application | O | | |
| | MTC-Cause 1310(n) | MTC-Cause Value | O | | |
| | Authentication response parameter 1310(o) | Authentication response parameter | O | | |

FIG. 13

METHOD AND APPARATUS FOR TRIGGERING MACHINE TYPE COMMUNICATIONS APPLICATIONS

CROSS REFERENCE TO RELATED APPLICATIONS

This application is a continuation of U.S. patent application Ser. No. 14/864,132 filed Sep. 24, 2015, which is a continuation of Ser. No. 14/475,116 filed Sep. 2, 2014, now U.S. Pat. No. 9,148,748, issued on Sep. 29, 2015, which is a continuation of Ser. No. 13/715,685, filed Dec. 14, 2012, which claims the benefit of U.S. Provisional Application No. 61/590,941, filed Jan. 26, 2012 and U.S. Provisional Application No. 61/570,682, filed Dec. 14, 2011, the contents of which are hereby incorporated by reference herein.

BACKGROUND

With the progress of the wireless technologies and mobile network deployments, wireless services for machine type communication (MTC) through the mobile network has become an important agenda under the third generation partnership project (3GPP). Mobile networks are currently designed for human-to-human communications, and are less optimal for machine-to-machine (M2M) or machine-to-human applications. MTC provides data communication involving one or more entities that do not necessarily need human interaction.

Wireless transmit/receive units (WTRUs) are generally programmed to autonomously set up a connection to report an event through the mobile network. However, in some applications and services it may be required that the network trigger the WTRUs. For example, during a storm, a water authority may desire to monitor dike and dam sensors in a specific area. It is expected that millions of these types of WTRUs may be deployed, and may be polled or triggered to initialize a message or a short message service (SMS) by a network signal.

Since a large number of WTRUs may be triggered at the same time in a relatively localized area for specific applications, causing too many network resources to be consumed, enhancement of a point-to-point delivery mechanism for WTRU triggering may be desirable.

SUMMARY

A method and apparatus for machine type communications (MTC) is disclosed. The apparatus may include circuitry to determine a frame during which to transmit a paging message for a group of MTC devices. The frame may be determined based on an MTC group ID assigned to the group of MTC devices. The transmitter may be further configured to transmit a paging message to the group of MTC devices during the frame. A transmitter is provided and may be configured to transmit an indication of the MTC group ID within the paging message.

A method and apparatus for machine type communication (MTC) authentication and triggering may be performed by an MTC interworking function (MTC-IWF). On a condition an Internet protocol (IP) connection does not exist between a services capability server (SCS) and an MTC device, a device trigger message may be received by the MTC device over a Tsp interface. The device trigger message may include a cryptographic key and may have an associated level of urgency. The method may further comprise determining a level of network congestion and transmitting the device trigger, including the received cryptographic key, to the MTC device in accordance with the associated level of urgency. A report may be sent to the SCS, associated with the determined level of network congestion, to indicate either success or failure of the device triggering procedure. The received cryptographic key may be used to secure an IP connection.

BRIEF DESCRIPTION OF THE DRAWINGS

A more detailed understanding may be had from the following description, given by way of example in conjunction with the accompanying drawings wherein:

FIG. 1A shows an example communications system in which one or more disclosed embodiments may be implemented;

FIG. 3 shows an example network architecture for delivering a trigger via cell broadcast services (CBS);

FIG. 4 shows an example of downlink non-access stratum (NAS) evolved packet system (EPS) mobility management (EMM) MTC device trigger request message used to carry content to an MTC application;

FIG. 5 shows an example of a downlink NAS EMM MTC device trigger request message used to carry short message service (SMS) content;

FIG. 6 shows an example of a paging method;

FIG. 7 shows an example subframe allocation used by MTC Device trigger/reach paging;

FIG. 8 shows an example paging message indicating that a paging trigger is for MTC device triggering;

FIG. 9 shows an example RRC paging/MTC device trigger message having the new message format;

FIG. 12 shows an example of the message format of dual purpose MTC device service or attach+trigger response message;

FIG. 13 shows an example of extended-service request message content;

FIG. 14 shows an example bit map that defines a cause value; and

DETAILED DESCRIPTION

Figure 1B:
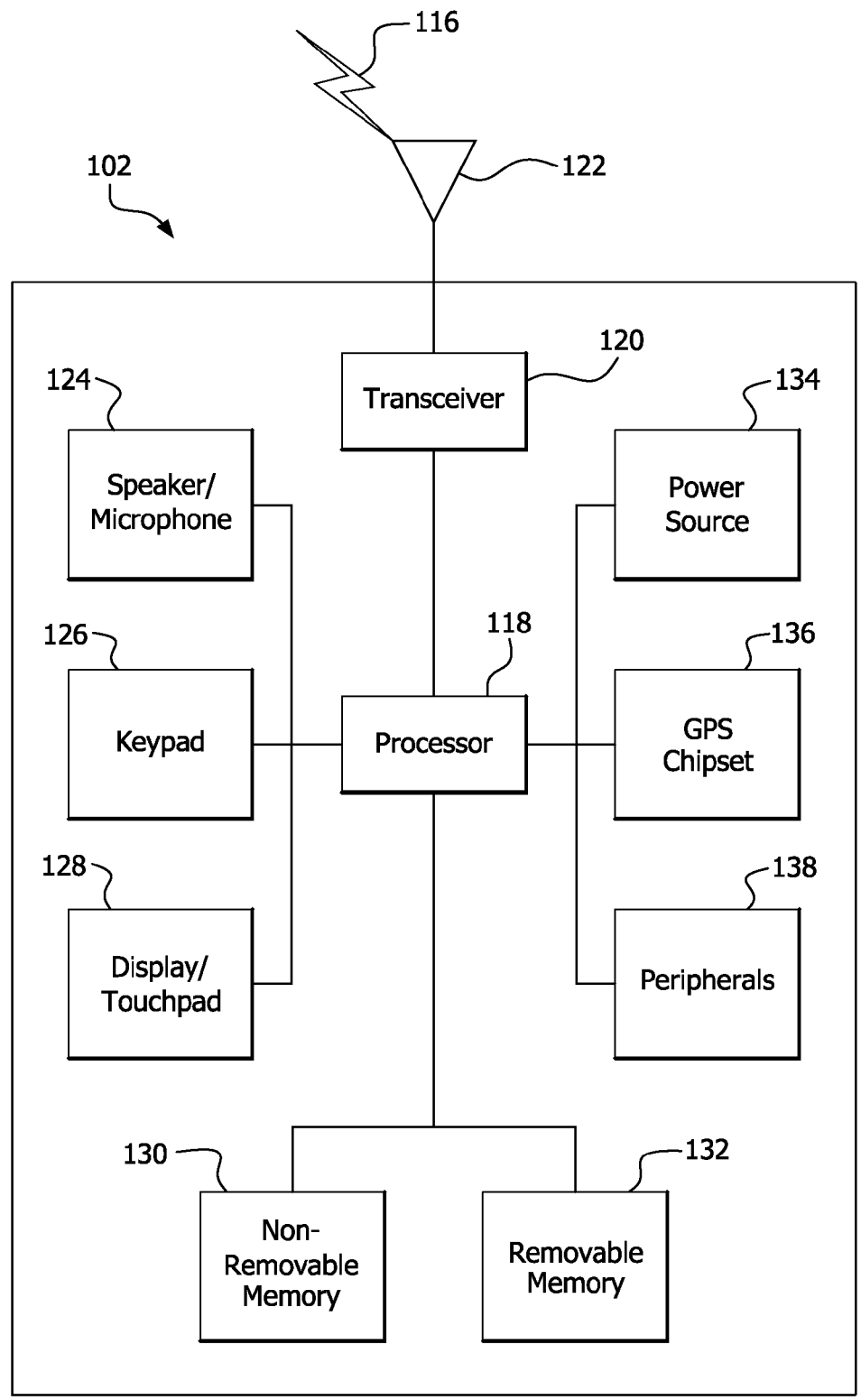
FIG. 1B shows an example wireless transmit/receive unit (WTRU) that may be used within the communications system shown in FIG. 1A.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
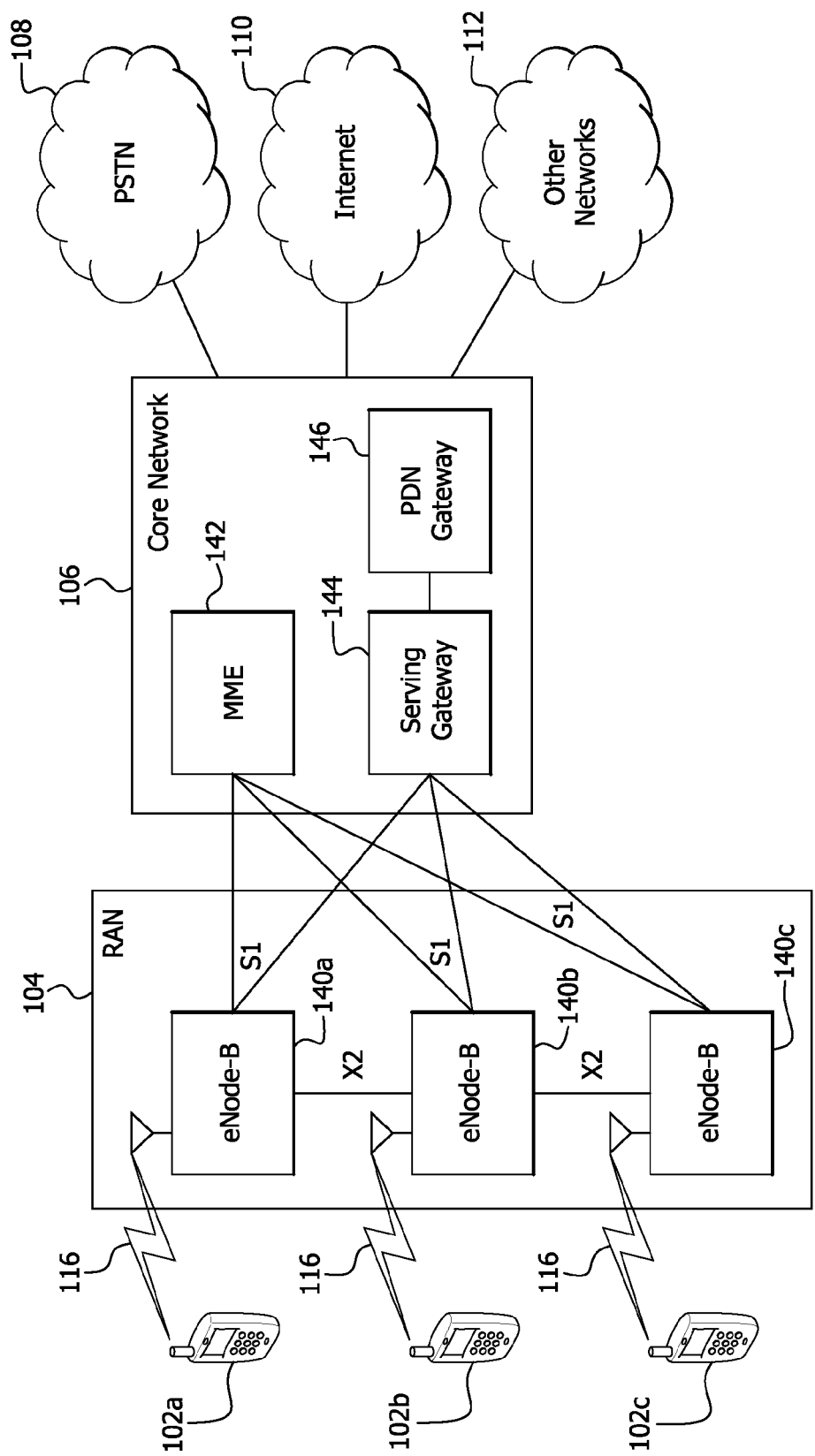
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Hereinafter, the terms "WTRU," "MTC device," and "device" may be used interchangeably.

Figure 2:
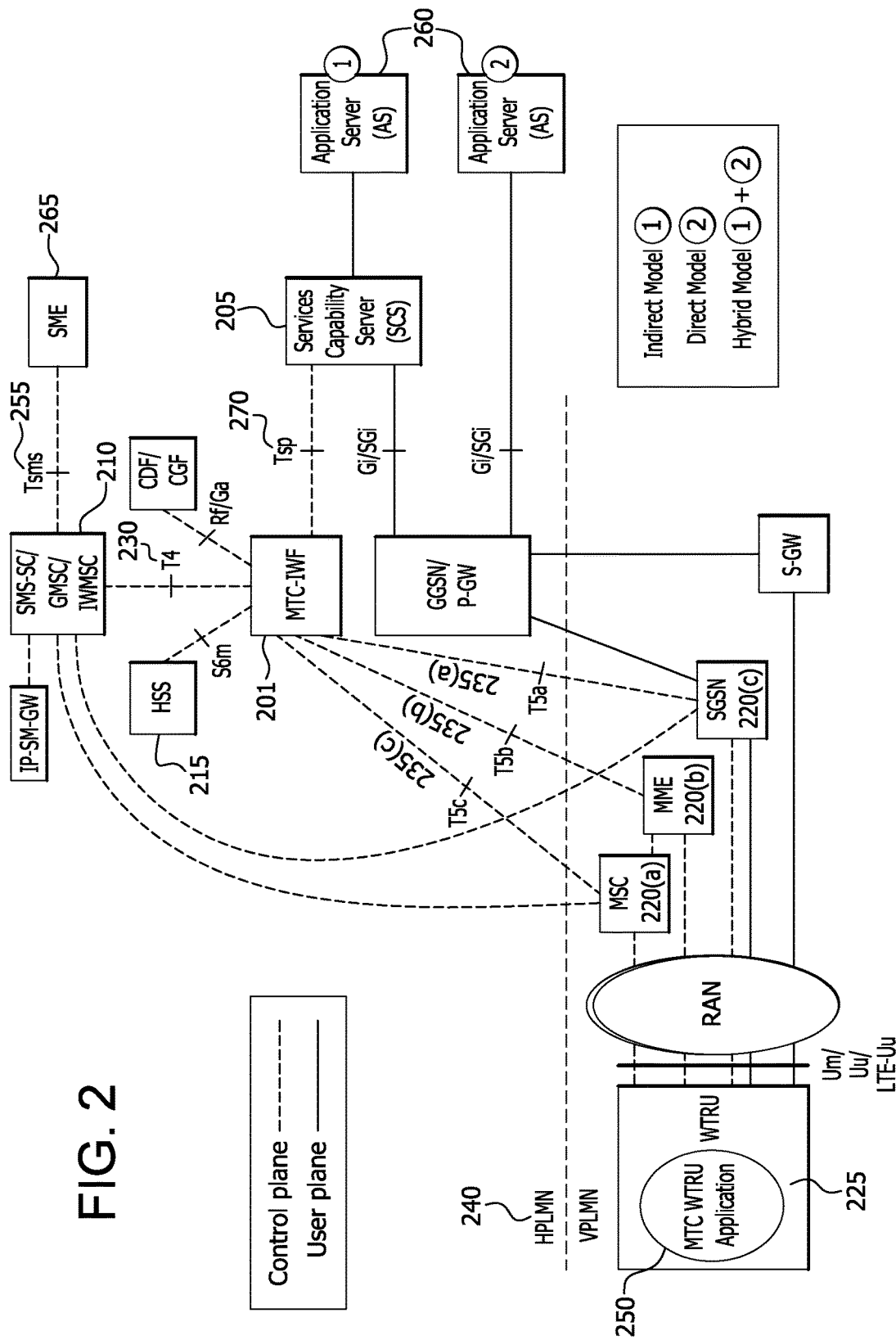
FIG. 2 shows an example of 3GPP architecture for Machine-Type Communication (MTC)

FIG. 2 in an example of 3GPP architecture for Machine-Type Communication (MTC). A Services Capability Server (SCS) 205 is an entity which connects to the 3GPP network to communicate with WTRUs 225 used for MTC and the MTC-inter-working function (MTC-IWF) 201 in the HPLMN 240 or a short message service (SMS) service center (SMS-SC) 210 for device triggering. The SCS 205 may offer capabilities for use by one or multiple MTC Applications 240. The WTRU 225 may host one or multiple MTC Applications 240. The corresponding MTC Applications 225 in the external network may be hosted on one or multiple Application Servers (ASs) 260 ultimately connected to the SCS 205.

Tsms 255 may be the interface that encompasses all the various proprietary SMS-SC 210 to a short message entity (SME) interface 265 standards and may be outside the scope of 3GPP specifications. The Tsms 255 may be used to transmit a trigger to a WTRU 225 encapsulated in a MT SMS as an over-the-top application by any network entity acting as an SME 265. Tsp 270 is a 3GPP standardized interface to facilitate value-added services motivated by MTC 201, for example control pane device triggering, and provided by the SCS 205.

An Application Programming Interface (API) may be used as an abstract to illustrate an example of an end-to-end view for MTC and to simplify mapping to MTC specifications of other standardization organizations. In an indirect model, MTC capabilities and the MTC Application in the external network may be collocated on the same SCS 205.

For a roaming scenario, the MTC-IWF 204 may have the connection with a home subscriber server (HSS) 215 and SMS-SC 210 within the home network only and with serving SGSN/MME/MSC 220(a)/(b)/(c) in a visited network.

MTC device triggering may start from the MTC application 250. An MTC application 250 may configure the SCS 205 for MTC device triggering. The SCS 205 may transmit a device triggering request to the MTC-IWF 201 with external MTC device identities (not necessarily 3GPP identifiers) via the Tsp interface 270.

The MTC-IWF 201 plays a role in bridging the SCS 205 and the public land mobile network (PLMN) for handling the MTC device triggering and other functionalities. An MTC-IWF 201 may co-exist with the SMS-SC 210 with an interface T4 230 or may connect to the SMS-SC 210 externally with a T4 230.

The MTC-IWF 201 interrogates the home location register (HLR)/HSS 215, when needed, to map external identifiers to international mobile subscriber identity (IMSI) or to some other MTC device internal ID (known to 3GPP network) and gather the device/WTRU 225 reachability and configuration information. The MTC-IWF 201 then selects the trigger delivery mechanism, for example, T4-SMS 240, T5-direct 235, or T5-direct-SMS 235, and performs protocol translation if necessary, and routes the request towards a relevant core network (CN) entity. For example, protocol translation may be necessary to reformat the triggered request to match the selected trigger delivery method.

The MTC device trigger requests generated by the MTC-IWF 201 may go to the CN controlling nodes over the T5 interface 235. For example, the CN controlling nodes may be a mobility management entity (MME) 220(b), serving general packet radio service (GPRS) support node (SGSN) 220(c), or mobile switching center (MSC) 220(a). The CN controlling node may make a decision on how the MTC device triggering is delivered to the MTC devices/WTRUs 225. An MTC device trigger may then be transmitted to the MTC devices/WTRUs 225 to invoke the MTC devices/WTRUs 225 performing certain actions and/or respond back.

The MTC-IWF 201 may transmit an SMS request in terms of an MTC device trigger over the T4 interface 230 to the SMS-SC 210, which may then generate and/or package the MTC device trigger in SMS form and dispatch the SMS to an MSC 220(a). It may then go to the WTRU 225 directly or via the SGSN/MME 220(c)/(b).

The MTC device may already be attached to the network and have a data connection with the network, or it may be attached to the network but have no connection established. In this case, it is called "online," which means that the MTC devices are registered with the network.

The MTC device may be unattached to the network or "offline," which means that the device is currently in an "unregistered" state with the network. The network may still have some knowledge about the MTC device. The MTC-IWF may need to keep the SGSN/MME addresses of an MTC device, per its IMSI or its device ID.

Additionally, the 3GPP network may support control signaling between the network entity SCS/SME and the 3GPP system via the Tsms reference point for submission of the device trigger requests as part of user data of a mobile terminated SMS (MT-SMS). The Tsms reference point is provided by an SMS-SC. The SMS-SC may reside at the edge of the operators' network. The SCS may request the SMS-SC to deliver a device trigger over the Tsp.

In LTE, the network may reach the idle mode WTRUs through paging operations such that the network transmits paging messages at specific time occasions to the WTRUs having an incoming call. The WTRUs may be monitoring the paging periodically in occasions assigned to them based on their WTRU IDs. The WTRUs may be identified by the WTRU ID in the paging message.

Alternatively, the network may reach idle mode WTRUs by broadcasting a system information broadcast periodically according to a schedule. WTRUs looking for system information may check and receive the system information when it is broadcast according to the scheduling.

Alternatively, the network may reach the idle mode WTRUs through multimedia broadcast multicast services (MBMS) mechanisms such that the network multicasts MBMS information and data over the multimedia broadcast over single frequency network (MBSFN) subframes (where no regular unicast is ongoing) and the WTRUs supporting MBSFN subframe reception may monitor the control information and receive the MBMS data on the MBSFN subframes according to the MBMS scheduling.

For MTC devices that are location fixed or location known, the network may employ some broadcast/multicast mechanisms for device triggering whether they are currently registered or not. The PLMN may multicast/broadcast a trigger message in a relevant cell or group of cells for efficiency to meet MTC communication scaling requirements. The MTC devices may be programmed to monitor a preset cell broadcast channel, even when they are not attached to the network, and have assigned a unique paging identity (LIPID). The SCS may transmit the MTC device trigger in cell broadcast messages to its MTC devices this way if the location information is available in the SCS.

For cell broadcast service (CBS) configuration, a mobile network operator may provide an interface to the cell broadcast center (CBC) to third parties. The SCS may transmit a trigger containing, for instance, geographic information and trigger information to the MTC-IWF over Tsp. The MTC-IWF may then act as a cell broadcast entity (CBE) to deliver the message to the CBC. The CBC may then distribute the cell broadcast message to the relevant MME. The CBS in LTE may be equated to the emergency warning message distribution.

FIG. 3 shows an example network architecture for delivering a trigger via CBS. The network architecture in FIG. 3 includes the CBE 301, the MTC-IWF 305, the CBC 310, the MME 315, the RNCs 320, the eNBs 325, a 3G network 330, and an LTE network 335.

In 3GPP 330, for the Earthquake and Tsunami Warning Service (ETWS) and Area Mail systems, the distribution area may be specified in cell units. However, in LTE 335, the distribution area may be specified in three different granularities: cell, tracking area, or emergency area (EA).

When the CBC 310 receives a request for emergency information distribution from the CBE 301, it may create a text to be transmitted to the terminals and specifies the distribution area from the information in the request. The CBC 310 may then transmit a write replace warning request message to the MME 315. When the MME 315 receives this message, it transmits the information to the eNBs 325 as specified in the distribution area.

When the eNBs 325 begin transmission of the emergency information, a paging message in which the ETWS indication is set is transmitted to the mobile terminal, for example, the WTRU. If a paging message containing an ETWS indication is received, the terminal begins receiving the system information broadcast that contains the emergency information. The eNBs 325 may use the message identifier to determine how the message is broadcasted, the distribution area (cell list), primary notification identifier, and secondary notification information, if available. Upon completion of a broadcast, the eNBs 325 return the result to the MME 315.

Core network congestion avoidance and backoff (BO) timers may be used in conjunction with MTC devices. A BO timer may be used to avoid congestion in a network due to access by numerous devices. Note that the BO timers also apply to WTRUs that are not MTC devices. BO timers may apply to WTRUs that are configured as low priority devices, for example, MTC devices, and to WTRUs that are not configured for low priority devices. Devices that are configured as low priority may set the radio resource control (RRC) establishment cause to "delay tolerant" when they attempt to obtain an RRC connection.

There may be a general mobility management BO timer per core network (CN) domain. For example, T3346 may be used for a packet switched (PS) domain and T3246 may be used for a circuit switched (CS) domain. This BO timer may also be referred to as a session management BO timer.

There may be a BO timer per access point name (APN). This timer may be used for session management to setup, modify, or release packet data network (PDN) connections. The WTRU may run at least one BO timer. Each timer may map to only one APN. This BO timer may also be referred to as a session management BO timer.

The WTRU may run both a mobility management and session management timer. If a mobility management timer is running in the WTRU, then the WTRU may not initiate a request, except if the WTRU is establishing a PDN connection for emergency calls or already has such a PDN connection established, or the WTRU is accessing the system with a specific access class 11-15. In both of these cases, the establishment cause used to obtain an RRC connection may not be set to "delay tolerant". The eNB may, upon detection of congestion, reject a connection after identifying a device as low priority, for example the RRC establishment cause="delay tolerant". The eNB may also provide a WTRU with a BO timer at the RRC layer. This BO timer may be known as an extended wait timer (EWT). When this happens, the RRC layer in the WTRU may provide the timer to the non-access stratum (NAS) which may run the mobility management timer with a value set to that of the indicated EWT.

A WTRU that is requesting a connection and the establishment cause does not indicate "delay tolerant", (even if the WTRU is configured as a low priority device, e.g., the WTRU sets an establishment cause to "emergency", despite being a "delay tolerant" device), may receive an EWT. If this occurs, the RRC may provide it to the NAS, which may ignore the EWT as this only applies to accesses with establishment cause set to "delay tolerant".

Given the T5 interface in FIG. 2 and the mechanism with the T5 direct MTC device triggering to the WTRU using an NAS message though the CN controlling node, embodiments for the new NAS message based solutions are disclosed including the T5 interface protocol. The new NAS message triggering mechanism may need new procedures over new parameters that would fulfill the task of device triggering within the 3GPP network.

Since a large number of MTC devices may be triggered around the same time in a relatively localized area for certain specific MTC applications, the point-to-point delivery mechanism for MTC device triggering may not be optimum since it may consume too many network resources at the same time. For downlink reaching methods, multicast mechanisms and enhanced paging mechanisms may be used.

A BO timer may be applied to devices that are low priority as well as devices that are not low priority. If the BO timer is running in the WTRU, for example, the mobility BO timer, the WTRU may request a connection and access the system if the WTRU needs to setup an emergency call, (or already has setup one), or if the WTRU is accessing the system with access class 11-15. The WTRU may be allowed to receive emergency calls, but the network operator may not want the WTRU to transmit additional requests for other PDN connections that are not related to emergency calls, for example, not related to IMS emergency calls. However, since the WTRU may only be running a mobility management timer, but not a session management timer, the WTRU may not see any restriction that prevents it from transmitting session management requests.

One possible method to combat this may be to configure the WTRU such that, if the WTRU is already running a BO timer, then the WTRU may not initiate other session management requests unrelated to the emergency call if it has a PDN connection for emergency calls and the WTRU was backed off. Also, the network may provide the WTRU with session management BO timers to prevent this from occurring. However, the primary problem may be that when the WTRUs ignore the BO timers and transition to a connected mode, (for example, for emergency calls or because of accessing the system with access class 11-15), the network may not be able to differentiate between the WTRUs that are requesting emergency calls but do not belong to access class 11-15, and WTRUs requesting emergency calls but belong to access class 11-15. If this information is missing at the network, the network may block non-emergency requests from all WTRUs that have an emergency PDN connection, even though the WTRUs that belong to access class 11-15 have the "right" to access the system for non-emergency purposes.

Embodiments for delivering the MTC device triggers from the MTC-IWF to the WTRU are described hereafter.

A T5 interface may connect an MTC interworking function (MTC-IWF) to a relevant CN node. Specifically, the T5a interface may connect the MTC-IWF to an SGSN, the T5b interface may connect to an MME, and the T5c interface may connect to an MSC. Both T5a and T5b interfaces may be IP network interfaces. GTPv2 is the top level protocol and GTPv2 runs over the UDP transport. The T5 interface may be used to carry MTC related SMS messages as well as other MTC related formatted messages such as NAS messages, for MTC device triggering or other purposes. One or more of the following attributes may be used to build a GTP tunnel (a distinct TEID) over the T5 interface: MTC message type (for example, SMS vs. other plain format messages) or a delivery mechanism; delivery scheduling priority and/or delivery schedules and/or traffic types (for example, establishing connection over c-plane only or u-plane connection needed or other types of triggering results); an individual RAN node or a group of RAN nodes (for example, eNBs or NodeBs or HeNBs/HNBs); local networks (for example, selected IP traffic offload (SIPTO)/local IP access (LIPA) nodes, such as L-GWs); mobile location areas (for example, tracking areas or routing areas); MTC device type or device service/application category; and MTC device (WTRU) current connection status (for example, idle vs. connected). The T5 interface may not only transport an MTC device trigger request and response messages between the MTC-IWF and the relevant CN nodes, the T5 interface may also carry the message for MTC device (upon roaming) location update information or the WTRU registration status information, including its DRX/sleep cycle configuration and lengths, from the CN nodes to the MTC-IWF.

The following procedures, messaging, transactions may be used in any combination. The CN node may transmit an acknowledgement that a request is being processed. The CN node may transmit an acknowledgement that a request is being processed, with a result of the processing. For example, the result of the processing may be failure or success and a reason code. The reason code may indicate the failure of the reachability using a specific method, for example, failure to reach via SMS, or failure to reach via user plane (UP). This may be used by the recipient (e.g., MTC-IWF) to try another reachability method. The CN node may transmit a failure due to unavailability of resources, alternatively with a backoff (BO) period during which the recipient (e.g., MTC-IWF) may not retry. The BO time may be for a specific device or for all devices, or a group of devices. In general, one node that implements the T5 interface may at any time inform another node about congestion start or end for one, a group, or all devices. The BO indication may be associated with an interval during which no request may be made. An exception to this rule may be requests for urgent or emergency communication or communication to a device that is high priority or that is a member of a specific class, and the like. Thus, a node (e.g., MTC-IWF) may indicate in all the T5 messages whether the request is for a "regular" or "prioritized" device or application within a device.

When the MTC-IWF has determined to invoke an MTC device trigger via the T5 interface, a T5 MTC device trigger message may be dispatched to the target. The T5 MTC device trigger message may be transmitted from the MTC-IWF to the CN controlling node, such as MME, SGSN, or MSC. The content and parameters of the message and the related semantics are described below. An MTC device trigger message from the MTC-IWF to the CN controlling node may contain one or more device triggers to one or more MTC devices or to one or more MTC device groups.

One or more of the following parameters may be transmitted in the T5 message to the CN controlling node for a device to be triggered: trigger request validity time, triggered device internal identities, MTC device locations, device reaching mechanisms, trigger device response expected, MTC device application profile, MTC device response time, MTC response type, trigger delivery urgency, and MTC device application ID.

The trigger request validity time may be the time that is passed to the CN controlling node to determine if the trigger is still valid. The triggered device internal identities, within a PLMN, may include the WTRU device ID, assigned MTC device ID, device paging/multicast ID, and/or device group ID in paging or multicast.

The MTC device locations may be, for example, tracking/routing area IDs, cells, such as cell-IDs physical cell identities/primary scrambling codes (PCIs/PSCs), a local health network (LHN) ID, home NodeB (HNB) ID, and closed subscriber group (CSG) ID. The device reaching mechanism may be, for example, point-to-point, paging, broadcast, and multicast. The trigger device response expected may be, for example, user plane (U-plane), control plane (C-plane) only, and simple-ACK.

The MTC device application profile may be, for example, access point name (APN) and operating system (OS) profile. The MTC device response time may be the time at which the device may respond, the time before which the device may manage or respond, the time after which the device may respond, or a time interval, (i.e., specified by a start and end time) during which a device may respond. The MTC response type may be whether an individual response is required for an independent device or a device that is part of a group of devices or a group-based response is desired.

The trigger delivery urgency indicator may be a trigger that needs to be delivered regardless of whether the network is overloaded or not.

The MTC device application ID may be used to trigger at least one application or multiple applications within the device. This may be a bitmap that identifies the applications. A value of 1 may indicate that the trigger applies to the application related to the bit position and a value of 0 may indicate that the application (corresponding to the position of the bit in question) is not being triggered. The relation of bit position to the type of application may be configured and known to both the device and the network, or may be negotiated upon registration of the device. In addition, there may be one application ID for which all of the above items are provided, for example, regarding response time, response type. Alternatively, all of the previous items may be applicable to all the applications that are being triggered. Moreover, some of the above items may apply to all or specific applications. For example, the response time or type may be for all applications, or there may be such information per application.

The above parameters may be used in any combination and are not restricted to MTC devices. Alternatively, these parameters may be pre-configured in the devices or preconfigured in the CN nodes or according to operator policies. The CN nodes may provide the required response characteristics, for example, as per the above parameters.

For an MTC-IWF generating MTC trigger requests to the CBC, to enable group MTC device triggering, another granularity of triggering area may be introduced to specify an MTC triggering area for MTC devices belonging to a certain PLMN, operator, and the like. A PLMN specific message identifier may be used so that WTRUs not interested in the messages may discard them.

When the MTC-IWF receives MTC device trigger requests from the SCS, the MTC-IWF may determine which device trigger delivery mechanism to use to reach the concerned MTC device or MTC devices. The MTC device trigger delivery mechanisms may include (but not limited to) one or more of the following. An SMS delivery mechanism over the T4 interface towards the SMS-SC, subsequently using SMS delivery path. A direct message transmitted over the T5 interface towards the CN controlling node. An SMS properly formed at the MTC-IWF and encapsulated in a T5 Protocol Data Unit to the MME/SGSN. A control or command transmitted towards the PDN gateway (P-GW)/gateway GPRS support node (GGSN) or to serving gateway (S-GW) for the MTC device trigger to go over the usual user-plane path to the MTC devices.

In the case that a particular WTRU (MTC device) has so registered such that more than one delivery mechanism may be used, for example, a WTRU has registered with CS and PS for SMS and PS for NAS message triggering, the delivery mechanism may be chosen by the MTC-IWF according to one or more of the following: information acquired from the HSS subscription record, information accumulated in the MTC-IWF, for example, during WTRU registration operation, mobility management operations, network load management (SON) from the CN nodes, or information supplied by the MTC-server or the MTC operation, administration, and maintenance (OAM).

The MTC-IWF may try several methods according to a specific order which may be based on an ordered list of methods as received from the HSS, or as preconfigured in the MTC-IWF or as per recommended method that may be received from any CN node. The above methods may be used in any combination.

The MTC user, for example, a power meter company, may specify a delivery method for all the devices it tries to reach, or the user of the MTC device/WTRU in the subscription data may give consent for a preferred method.

The MTC device may be in one of the following operating states: connected currently active, connected in long discontinuous reception (DRX) state/mode, idle state but remain registered, or offline or deregistered. For connection currently active, the MTC may use a point-to-point delivery method such as SMS or direct NAS message. For connected in long discontinuous reception (DRX) state/mode, the MTC may use a T5 delivery method to invoke multicast triggering. For idle state but remain registered, the MTC may use a T5 delivery method to invoke multicast triggering. For offline or de-registered, the MTC may use a T5 delivery method to invoke multicast triggering.

The MTC-IWF may receive relevant CN load conditions and/or relevant RAN load conditions, and may choose a lighter-loaded path (hence the delivery mechanism) to dispatch the triggering indication. MTC device location in the PLMN network may be considered where a certain delivery mechanism is available or preferred. If a U-plane path for MTC-device response is expected, the point-to-point SMS or NAS message trigger may be used. If a C-plane response is needed, any method may be used. If a simple ACK is needed, a NAS message+a multicast method may be used.

The MTC-IWF may deliver the MTC triggers over the T5 interface if the target CN is not overloaded. However the MTC device triggers, marked with a "trigger delivery urgency indicator," may be delivered to the congested CN. The MTC device triggers with the "trigger delivery urgency indicator" may come from those particular SCSs specifically authorized and/or authenticated to input such urgent device triggers.

The MTC-IWF may collect the responses from the T5 interface on various T5 trigger requests. If a negative acknowledgment comes back from the MME, or no response is received during a specific time interval, one of more of the following may be performed by the MTC-IWF. The MTC-IWF may initiate another delivery if the original request is still valid, for example, remaining time in validity period. Alternatively, if the CN is overloaded and the validity time is not over, a suspend report and subsequent actions of the MTC-IWF may be based on a failure value from the MME/SGSN/MSC. Alternatively, the MTC-IWF may transmit a failure report to the SCS, or to a default node. The default node may be preconfigured in the MTC-IWF or may be specific to every device. For example, the HSS may provide the MTC-IWF that the SMS-SC is the default node, or last resort destination, for a particular device or group of devices in which all or a subset of other reachability methods fail.

The MME/SGSN may decide whether the MTC device trigger may be delivered using point-to-point NAS message, SMS, via RAN level paging, or CBS. The MME/SGSN may also decide whether the MTC device trigger maybe delivered using a multicast method based on the WTRU state, WTRU location, WTRU capability, such as, registered information, RAN load situation, and the trigger request validity time duration. One or more of the following considerations maybe used by the MME/SGSN.

The MME/SGSN may decide that the device trigger may be delivered point-to-point via an NAS MTC device trigger message or an SMS message, if the MTC device/WTRU is in a connected state with an active C-plane connection, if the trigger validity time is longer than the expected MTC device/WTRU's next non-MTC related uplink activity, if the device is in a RAN, cell, or area, for example, a tracking area (TA), routing area (RA), location area (LA), that is not heavily loaded, or if the trigger request comes from the MTC-IWF with the preference of point-to-point delivery. For example, related uplink activity may be the next tracking area update (TAU).

The MME/SGSN may decide to use one-to-many signaling, for example, paging, CBS, or multicast, if one or more of the following is relevant: if the MTC device/WTRU is in a connected state but under long DRX mode (in the MTC this may mean one half minute to several days or more) or the MTC device/WTRU does not have an RRC Connection, if the WTRU capability indicates it may receive one-to-many signals, for example, paging, CBS or multicast; if the trigger validity time remaining indicates a trigger action needs to be taken soon; if the trigger request comes from the MTC-IWF with the preference of a point-to-many delivery method; if there is a large number of triggers from the MTC-IWF; or if the eNB, where the device to be triggered resides, supports one or more of the point-to-many delivery for MTC device triggers.

When the MME decides to use point-to-many delivery mechanism, for MTC device trigger requests from the MTC-IWF, the MME may buffer/accumulate the similar requests together for a while for the same eNB or for a similar trigger time. For example, the MME may buffer/accumulate a certain portion of the request validity time.

The MME/SGSN may hold back the delivery of triggers to the RAN that have indicated overload. However those triggers that are marked with an "urgency indicator" may be delivered to the RAN regardless of overloading/congestion or not.

Alternatively the delivery mechanism decision may be made by an eNB or jointly by the MME and the eNB. For point-to-many delivery of the MTC device triggers, the eNB may decide which mechanism to use, how the MTC device responds, and how to schedule the trigger delivery.

The MME and/or the eNB may collect the responses or the acknowledgments from the MTC devices/WTRUs and determine whether a re-attempt or a failure report or failure action may be taken.

For a network node CBC in the MTC device trigger system, when the CBC transmits a trigger related message to the MME, a new message identifier may be introduced from the CBC to the MME to initiate the MTC device trigger start/replace. The new message may map to an existing or new primary notification and include additional information such as distribution area, MTC group identifier, a list of MTC devices that are being triggered, repetition period, and number of broadcasts requested.

In order to avoid that this capability does not interfere with the original purpose of the CBS, for example, warning system for natural disasters and other events, the CBC may assign priorities to the entities assigned to it, and the message identifiers it receives. The CBC may ensure that all public warning messages are broadcast before any MTC triggering messages are broadcast.

In order to address the scalability of using the broadcast resources for triggering a large number of devices, the CBC may spread the MTC triggering notifications to restrict the number of devices triggered per message, or transmitted a new distribution period to the eNB.

A home NodeB (HNB) and home evolved NodeB (H(e) NB) gateway (H(e)NB-GW) may be deployed as a proxy to handle the MTC devices. Under this model MTC devices may be locally attached to the H(e)NB without requiring periodic network registrations. Such devices may be present at the H(e)NB subsystem level.

In a deployment where MTC devices, low priority devices or any other device holding similar characteristics, need to be contacted to either push or pull data, the concept of HeNB GW may be used to enable at least the following capability. The MTC device may register to the HeNB GW prior or during regular network registration and the HeNB GW may be used as a proxy to allow for addressing the device using a group-ID based on the HeNB GW-ID or for periodic HeNB GW registration with a periodicity less or equal to the regular periodic network registration.

If an MTC device roams into a different PLMN, or if the MTC device incurs any tracking area change or serving cell change that may involve a serving CN node change, the target CN node may need to update the MTC-IWF on the location changing of the particular MTC device or WTRU. The update information may include the WTRU-Id including the MTC-ID or the MTC-Group-Id, the IMSI or other forms of MTC device internal ID, or the new location information such as cell-id, RAN-node-Id, or Area-Id. The device MTC information may include one or more of the scheduling information, for example, the DRX cycle length, the current C-plane and/or U-plane connection information, and additional RAN mechanism information, for example, using MBMS or using CBS for triggering.

The target CN node may obtain the information from the source CN node during the roaming handling procedure, or the target CN node may obtain these information from the RAN node or from the WTRU directly. If an MTC device moves to a different tracking area or changes to a different serving cell within the same CN node, the target RAN node may need to update the CN node with one or more of the pieces of information described above.

An NAS MTC device trigger, for example, an MTC device trigger request, message may be constructed at the mobility management (evolved packet system (EPS) mobility management (EMM) or global multimedia mobility (GMM)) level at the MME. The NAS MTC device trigger message may be delivered to an MTC device or WTRU when it is in evolved packet system (EPS) mobility management (EMM)-connected mode (EMM-registered-normal-service). Alternatively an existing downlink NAS MM level message may be modified to contain one or more of the following parameters with similar semantics defined below to perform the MTC device trigger.

The NAS MTC device trigger message may contain one or more of the following parameters: an MTC device ID or MTC device group ID, an MTC device trigger authorization code, a security parameter for subsequent device-network interaction, a trigger request type, a response type and duration, a response ID, a response resource type, a responding-area-scope, an MTC device message container, and a type of MTC application or application ID.

The MTC device ID or the MTC device group ID may be that with which the WTRU performs some authorization check to see if it is the intended recipient given the group-paging, CBC and the multicast. The MTC device trigger authorization code helps the WTRU to verify the trigger source (SCS) feature for MTC feature control, whether the MTC device is allowed to be triggered this way. The security parameter for subsequent device-network interaction may be for example, a KSI, an encryption-algorithm or a security nonce. The presence or absence of this parameter may determine the WTRU response security level.

The trigger request type may be, for example, the purpose of the triggering. For example a trigger that is simply for monitoring to see if the device is still alive or a trigger that may command the device to perform some task, such as to open a gate, or a trigger to ask the device to transmit certain data and then download new software and then reset. The trigger request type may dictate how the WTRU is to respond to the trigger.

The response type and duration may indicated whether the WTRU response may be immediate or may be delay tolerant within the duration or the WTRU may use higher priority approach if at the end of the response duration. The response ID may be assigned by the MME to identify the WTRU response. The response resource type may be, for example, U-plane EPS-bearer, associated APN, LGW, or C-plane, or a simple response such as ACK. The responding-area-scope, for example, if the device is roaming, may indicate in which cell, which area, or which PLMN the WTRU is allowed to transmit the response.

The MTC device message container may include MTC application specific contents to the possible MTC layer or to the MTC application. The type of MTC application or application ID may be used to indicate which one MTC application needs to transmit the response if there are multiple MTC applications running on the device.

FIG. 4 shows an example of a downlink non-access stratum (NAS) evolved packet system (EPS) mobility management (EMM) MTC device trigger request message used to carry content to an MTC application. The "MTC specific message container" information element (IE) may allow the MTC specific application information to be encapsulated therein. This may facilitate the specific information passing either to an MTC layer, if there are multiple MTC applications on a device, or to the MTC application.

FIG. 4 includes information element indicator (IEI) 405, an information element 410, a type/reference of the information element 415, presence of the information element 420, format of the information element 425, and length of the information element 430. The information elements contained in the EMM message may be protocol discriminator 410(a), security header type 410(b), MTC device trigger request 410(c), MTC device ID or group ID 410(d), authorization or security code 410(e), MTC device trigger request type 410(f), trigger response resource type 410(g), response ID 410(h), response area scope 410(i), and MTC specific message container 410(j). When the MTC device/WTRU receives the MTC device trigger request message, the MTC device/WTRU may respond with an MTC device trigger response message to the MME. The IEI for the MTC specific message container IE 410(j) is XX 405(j).

The T5-Direct-SMS interface is between the MTC-IWF and the MME, which may be used to carry MTC device trigger SMS for PS-only WTRUs. When the network is equipped with this capability, the network may indicate this capability/configuration/setup to the WTRUs in system information directly or embedded in the NMO part of the system information elements. The network may also indicate the capability/confirmation/setup to the WTRUs in NAS response messages to the first WTRU NAS request messages, for example, attach accept or TAU accept. A PS-only WTRU with this T5-direct-SMS capability may register to this type of service with special "PS-only-SMS" attach type in single and combined attach activities.

If the WTRU has more than one MTC trigger reception capability, the WTRU may choose one capability for the session, or the WTRU may indicate all for subsequent MTC-related communications and let the network pick one mechanism for subsequent operations. For example, the MTC reception capabilities may be SMS, NAS message, or direct-MTC-SMS.

When the MTC-IWF needs to transmit a trigger message over T5 SMS to the WTRU, the MTC-IWF may first verify, either through an HSS, an SCS or some other entity in the network or directly, whether or not it has a T5 connection to the MME. When the T5 association with the MME is created then the MTC-IWF may continue with the procedure. The MTC-IWF may build and encapsulate the SMS message into the value part of the NAS message container information element of a T5-DOWNLINK-DATA message or a similar message and transmit this message to the MME. This NAS message container or the T5-downlink-data message may contain a new element indicating that this SMS is over device trigger purpose.

When the MME receives a T5-downlink-data message, the MME may copy the contents of the NAS message container information element to the value part of the NAS message container information element of a Downlink NAS Transport message and transmit the downlink NAS transport message to the WTRU. It may also transmit a special indication informing the WTRU that the SMS message is for paging the MTC device. This procedure may be applied for the uplink case when the device transmits an SMS response to the trigger request message.

If the WTRU is in an idle mode, the MME may transmit a page message for device trigger. This paging message may contain an indication informing the WTRU that it is for device trigger. Upon receiving this paging, the WTRU may start the service request procedure, and the MME may then forward the trigger SMS as part of a service request procedure.

In addition to carrying the MTC specific message in the above described MTC device trigger request, the message may be used to carry an SMS to an MTC device at the point of an MME. Message format wise, this may be accomplished through explicit coding through the IEI field, such that a special IEI=XY indicates the SMS container.

FIG. 5 shows an example of a downlink NAS EMM MTC device trigger request message used to carry SMS content. This message may use a carrying container type to indicate which kind of payload, (MTC specific or an SMS), is included. FIG. 5 includes IEI 505, an information element 510, a type/reference of the information element 515, presence of the information element 520, format of the information element 525, and length of the information element 530. The information elements contained in the EMM message may be protocol discriminator 510(a), security header type 510(b), MTC device trigger request 510(c), trigger content type 510(d), MTC device ID or group ID 510(e), authorization or security code 410(f), and MTC SMS container 510(j). The IEI for the MTC SMS container IE 510(j) is XY 505(j).

If the WTRU is in an EMM-idle mode or in an EMM-deregistered state, the MME may page the WTRU. If the WTRU learns from the paging that an MTC device triggering is in effect, other than a pure WTRU paging, the MTC device may respond with a different first MM message, other than the Service Request with "paging response", as the MTC device trigger response and may establish a different signaling path avoiding unnecessary U-plane bearer establishment.

The current RRC paging message may be modified to inform WTRUs that this is a paging for an MTC device trigger.

FIG. 6 shows an example of an RRC paging method. As shown in FIG. 6, the WTRU-ID 601 may be set to be an MTC-ID-info 605 or an MTC-group-ID-info inside the paging record IE paging WTRU-ID. A new field called "MTC-ID-info" 615 may be added to indicate that the concerned paging record is for an MTC device trigger or some other MTC related downlink reaching activity. The MTC-ID-info 605 or the MTC-group-ID-info IE may expand to the field MTC-identity-info 610, which may contain one or more of the following information specifically for the MTC activities: the value of the IMSI or international mobile equipment identity (IMEI) of the MTC device; the value of an assigned MTC identity or the MTC Group ID of the device; the category or the purpose or the intended action command of the MTC paging action, for example, for an MTC device trigger, for an MTC small data Tx, for an MTC device monitoring check, for a device to take an action (i.e., open/close a gate), or for a device maintenance action; and the paging response type indicator indicating how the WTRU responds to this paging. For example, the WTRU may respond by establishing a regular EPS connection or establishing a signaling connection or act for a simple response to the paging.

In order to not impact the legacy WTRUs, or non MTC WTRUs, with the existing paging procedures by the MTC device triggering/reaching specifics (i.e. the more frequent paging occasion intent), one or more of the following may be employed by the network and the MTC devices/WTRUs.

In a first example, the paging message for MTC devices/WTRUs may be transmitted on a different time occasion than the regular paging. The paging message may be transmitted on a different LTE frame than the regular WTRU paging frames as the following scheduling form:

$$(SFN+j) \bmod T = (T \div N)*(WTRU\_ID \bmod N), \qquad \text{Equation (1)}$$

where j is an offset frame number separating an MTC paging frame from a regular paging frame and j=[1, 2, . . . , (T div N)−1]. The frame offset number j may be predetermined or network configured. The WTRU ID may be calculated by IMSI or by MTC identity.

In a second example, the same or different LTE paging frame may be used, but the MTC triggering/reaching signal/message may be on a different subframe, for example, subframes other than #0, #4, #5 and #9. In one example, subframe #3 and #8 may be allocated to the MTC device trigger/reach, such that when MTC devices using MTC-ID to compute for the subframe number, the new number of subframes formula is modified to:

$$Ns = \text{Max}(1, nB/2T). \qquad \text{Equation (2)}$$

FIG. 7 shows an example subframe allocation used by MTC Device trigger/reach paging. FIG. 7 includes the number of subframes (Ns) 705, paging offset 710 (PO) when i_s=0, and PO 715 when i_s=1.

A new indication may be added to the paging message to indicate the paging trigger is for an MTC device triggering. FIG. 8 shows an example paging message indicating that a paging trigger is for MTC device triggering. An MTC WTRU in RRC_IDLE or RRC_CONNECTED mode may read the mtc-TriggerIndication 801 to know if this paging message was initiated for MTC device triggering. The WTRUs that are monitoring the MTC triggers may perform further actions on receiving this indication which may include reading additional or new system information fields to get further information associated with the device trigger, and may initiate the trigger response according to the device trigger received.

FIG. 9 shows an example RRC paging/MTC device trigger message having the new message format. If an RRC paging/MTC device trigger message 901 is dedicated to MTC device triggering/reaching, one or more of the following may be specified. The L1/2 signaling for the MTC device paging may use the same paging radio network temporary identity (P-RNTI) or a new MTC-P-RNTI, but in a different physical downlink control channel (PDCCH) search space for the MTC devices or in an extended PDCCH (E-PDCCH) search space for the MTC devices. The new search space for the MTC trigger/reach signal, for example, MTC-P-RNTI, whether it is in a PDCCH or an E-PDCCH and the associated paging/trigger message data may be confined to the center portion of the carrier or channel frequency range to suit the narrow bandwidth MTC devices/WTRUs. The RRC paging/MTC device trigger message 901 may take a new message format so that the paging/trigger message may also serve as a downlink MTC device signal to wake the MTC device/WTRU 905 up and to directly command the MTC device/WTRU 905 for certain actions desired by the MTC service operator or application.

The cell broadcast service (CBS) mechanism in LTE may be equated to the warning message broadcast in the form of the E-UTRAN system information broadcast mechanisms. The cell-broadcast method may be applied to both non-attached (offline) and attached (online) devices. For MTC device triggering, one or more of the following new actions may be employed.

A new system information block (SIB) or SIB set may be devised for the MTC device triggering purpose. A separate system information (SI) message may be used for this CBS for MTC device triggering. In addition to an MTC triggering primary notification, the new MTC device trigger system information may alternatively include secondary notification data including MTC operator specific group identifier, MTC operator specific individual identifier, and secure information from the MTC server. The SI may be broadcast in the cell, and the device trigger content may change at each transmit occasion, not preserving the MP boundary rule. Therefore, there would be no need to indicate the content change in the paging messages. WTRUs may not wait for the modification period (MP) boundary to read it. The WTRUs may read it anytime they need to, for example, according to their own power saving schedule or the MTC-trigger-SIB scheduling or both.

If the CBS MTC device trigger message is dedicated to MTC device trigger/reach, one or more of the following may be specified. In order to save system resources and create no impact to the legacy WTRUs, an alternative method to schedule the MTC device trigger/reaching SI, independently of the regular SI scheduling, may be to use a different MTC-SI-RNTI for downlink control information (DCI). For narrow bandwidth MTC devices, the SI-RNTI or the MTC-SI-RNTI may be transmitted in PDCCH or E-PDCCH in a search space that is in the center portion of the carrier or channel frequency range.

The SI occasion frame number may take the form of [SFN mod MTC-periodicity=MTC-offset], where both MTC-periodicity and MTC-offset may be predetermined or network configured. For the subframe number to begin the MTC device trigger transmission, it may be from any subframe number excluding #0 and #5 since the WTRU may need to acquire the MIB and SIB-1 at the time. The SI transmission window length may be 1 to w, where w may be predetermined or configured by the network. If the transmission window size is one subframe, the SI may be transmitted with one or more HARQ RV at the same time or the SI may be transmitted with no hybrid automatic repeat request (HARQ) redundancy expected.

The MTC device trigger/reaching SIB may contain one or more of the following information: one or more MTC-Group-ID, which may contain the MTC-IDs within the group; the trigger category or purpose or command or type of the MTC trigger for each MTC-ID; the trigger response type; an indication on whether an access delay may be applied and the parameter to calculate the access spread.

A new RRC message for MTC device trigger may be transmitted in the MBSFN subframes. The MTC message may be changed anytime.

A new RRC message may be designed to carry the MTC device trigger information to MTC devices. The scheduling of the new message may be one of the following. The new message may be transmitted in the same occasion as the existing MBSFN RRC messages. The new message may be transmitted last if it collided in transmission with the existing RRC MBMS messages. The MTC device/WTRU may need to decode this message accordingly, skipping the contents of the old MBMS messages.

The new RRC MTC message over an MBMS control channel (MCCH) may be scheduled more frequently in specific MBSFN subframes such as the first available MBSFM subframe in an LTE frame with [SFN mod (mcch-RepetitionPeriod/n)=mtc-mcch-Offset], where n is a number of [2, 4, 8, 16] and the mtc-mcch-Offset is a [1, 2, 3, . . . , mcch-RepetitionPeriod/n]. The new MTC device ID or the MTC-Device-Group-ID may be employed as the MBMS-service-ID, for example, the temporary mobile group identity (TMGI).

MTC devices/WTRUs may use the assigned MTC device or device group identity, MTC service or service group identity, or MTC application or application group identity, and the like as the MBMS-service-identity, (i.e., TMGI), and the MBMS session identity to look for MTC device trigger information in MBMS multicast data stream. MTC Devices/WTRUs may receive the existing MBSFN area configuration message to determine the presence/absence of a specific MBMS service IDs that mapped to the above mentioned MTC Device-ID or other MTC service/application related identities.

MTC devices/WTRUs may decode the MBSFN area configuration message and use the mapped MBMS service-Id (i.e., TMGI) to receive the specific MTC Device Trigger transmission information in an MBMS transmission, for example, the logical channel identity of a particular MBMS point-to-multipoint traffic channel (MTCH). MTC devices/WTRUs may receive the MSI (i.e., medium access control element (MAC CE)) to determine the MBSFN subframe(s) that contains the MTC device trigger information from the MTCH logical channel identity. The MBMS-Service-ID may be placed either in the beginning or the end of the MBMS traffic channel (MTCH) transmission. For example, the MBMS trigger information may be placed as the first MTCH in the first MBSFN subframe or the last.

The MBMS service-ID of the MTC device/WTRU may be a certain MTC identity, such as a device ID, service-ID or application-ID, assigned in the universal subscriber identity module (USIM) or be constructed by the MTC device with some parameter in the USIM and some data from the system information.

If the WTRU is already connected, the MTC device trigger may be transmitted via a new MAC CE. The new device trigger MAC CE may contain the MTC application ID and other application specific content. The new CE may be transmitted to the WTRU independently or together with other downlink data packets. The eNB may decide whether a device trigger MAC CE may be transmitted, depending on the device trigger indication received on S1 signaling from the MME. Upon receiving this MTC device trigger MAC CE, the WTRU MAC layer may directly submit the content of the CE to the intended MTC application.

If the MTC device/WTRU receives the MTC device trigger in a connected state, the device/WTRU may respond by establishing a specific U-plane connection even if the request does not specifically ask for it but the device/WTRU has certain amount of application data to transmit. For example, the specific U-plane connection may be a packet data network (PDN) connection/packet data protocol (PDP) context to a specific APN specified in the trigger message or by the need of the application data transfer.

Alternatively, the device/WTRU may respond with the existing C-plane connection if there is no specific data or small data to be transferred to the network.

Alternatively, the device may be provided with at least one method of response, such as in a specific order. For example, the device may perform a set of procedures in the given, or any other, order: {control plane (CP)-SMS, CP-other, UP-PDN, UP-other, UP-local IP access (LIPA), UP-selected IP traffic offload at local network (SIPTO@LN)}. Thus, the device may attempt to respond according to the list provided and its capabilities as well. For example, the device may try a particular method or eliminate certain methods if the device does not support these schemes. Alternatively, the device may use the CP even if the response type is set to UP, given the UP may not be set up, for example, due to APN congestion or any other problem that might prohibit the setup of the required/request/desired response type. The device may attempt another method of response, even if not requested/specified in the trigger, when the specified method fails or cannot be met due to any problem, for example, congestion, device settings, radio conditions, and cap abilities.

In addition, the device may respond according to any time limitation it may receive in the trigger. The possible time limitations may be as defined above. Moreover, if the response type indicates a response via a specific PDN/APN that may be a LGW, the device may attempt to establish a PDN connection to the specific PDN/APN, for example, a LIPA or SIPTO@LN connection may be established by the device.

If the MTC device/WTRU does not have an RRC connection/MM connection with the network then, depending on the MTC triggering type the device/WTRU has received, the WTRU may respond to the trigger message at various time occasions as follows.

If the trigger message the WTRU received is deemed "non-definitive time constraint" for response, the WTRU may transmit the response when the WTRU gets connected to the network again for some other non-MTC related uplink transmission occasions, for example, the next TAU or attach or detach.

If the trigger message comes with a response time duration, either network worked configured time or predefined time, the WTRU may transmit the response with the non-MTC uplink transmission before the time duration is over, or start a RRC connection when the response time duration is about to expire and transmit the trigger response message. For example a predetermined time frame may be that a water company wants the water meter to report the water usage within a given time frame or predefined time frame.

If the trigger message requires the WTRU to respond immediately, the WTRU may start to transmit the trigger response as requested.

If the triggering is a group type triggering, if there is a spread time included in the message, the WTRU may draw a random number within the time frame given by the network and transmit back the response message. If there is no timer given in the triggering message, the WTRU may transmit back the trigger response message immediately, or the WTRU may impose a delay to transmit back the triggering response to avoid overloading the network and/or the RAN.

Depending on type of triggering message the WTRU receives, the response message may be transmitted in one or more of the following ways. The MTC device may transmit back the trigger response message via SMS. The MTC device may establish a PDP context or a PDN connection and communicate to the MTC server via the U-plane. The MTC trigger response message may be an MM level NAS message. If the network expects an ACK or a short response from the MTC device, the MTC device may transmit a triggering response with one of more of the following.

The trigger response may be a simple ACK to acknowledge that the MTC device has received the trigger message, a combined ACK indicating that the MTC device has received the trigger and the requested action has been performed successfully, or an action-NACK indicating that the trigger message has been received by the MTC device but the requested action is rejected or failed.

The trigger response may be encapsulated or included in an existing RRC message. In case the access stratum (AS) level authentication has not been completed, the eNodeB may alternatively delay forwarding the trigger response message until the authentication procedure has been completed. The trigger response may be included in the RRC connection request message, or the trigger response may be attached to the RRC connection complete message.

If the RRC message is used to carry the trigger response, to limit the resources used for MTC triggering and response procedure, some enhancement to the authentication procedure may be made for MTC. The network may enclose a standard or MTC specific authentication request message or IEs in the trigger request message. The authentication method may either be standard authentication key agreement (AKA) or modified MTC-specific authentication method. After the MTC device authenticates the network, the MTC device may enclose an authentication response IE in the trigger response message. When the network has authenticated the MTC device, the network may forward the triggering response message to the MTC-IWF and thereafter the MTC server.

The trigger response message may be encapsulated, attached, or included in an NAS message, including but not limited to the following; attach request message, TAU, service request or/extended service request, uplink NAS transport, and the like.

In order to save WTRU battery life and reduce Uu interface load, if a device trigger (DT) is not real time or emergency, the WTRU/MTC application may delay the response. For example, a water meter company may trigger a water meter application to upgrade its software. The trigger may be transmitted to a group of MTC devices. If the requirement is that all MTC applications have to upgrade to a new version of software within a day, then it is not necessary for all of the MTC applications to start upgrading their software immediately after being triggered. In some cases, the triggering response may be delayed.

In the DT trigger message, the network/SCS may specify a delay response time that it expects of the MTC application. After the WTRU receives the triggering message, the WTRU may delay to dispatch the trigger to the MTC application until either the delay response time expires or the WTRU goes back to connected mode by another procedure, for example, TAU or MO call. Alternatively to reduce Uu traffic, if the trigger the WTRU received is a group trigger, the WTRU may randomly choose a response time within the delay response time. Alternatively, the WTRU may dispatch the trigger to the MTC application immediately, but when the MTC application responds, the WTRU delays the response message until either the delay response time expires or the WTRU returns to a connected mode by another procedure, for example, TAU or MO call.

Figure 10:
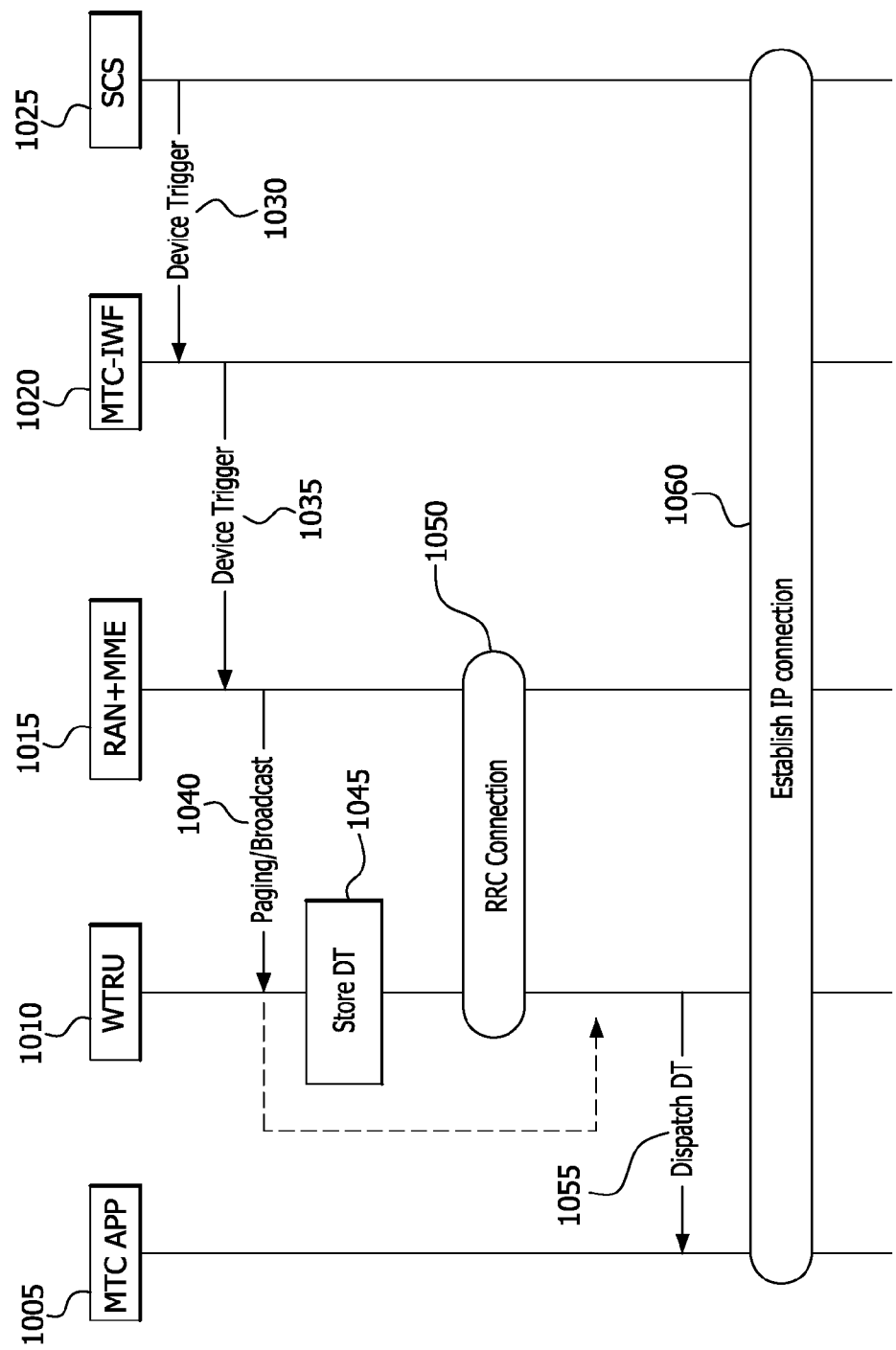
FIG. 10 shows an example of a delay response procedure.

FIG. 10 shows an example of a delay response procedure. FIG. 10 includes an MTC application 1005, an MTC device/WTRU 1010, a RAN+MME 1015, an MTC-IWF 1020 and an SCS 1025. A device trigger 1030 is transmitted from SCS 1025 to MTC-IWF 1020. The device trigger 1035 is forwarded to the RAN+MME 1015. When the RAN+MME 1015 triggers the MTC application 1005, it may use paging, a cell broadcast, a NAS message, or SMS as a triggering message 1040 transmitted to the MTC device/WTRU 1010. In the triggering message 1040, the network may specify the MTC device ID or MTC group ID to specify which WTRU, or a group of WTRUs, may receive this trigger. The triggering message may include a maximum delayed response time value, which indicates the latest time that the SCS 1025 expects to receive a response from the MTC application 1005. The triggering message 1040 may include an MTC application ID or an MTC application group ID to identify at least one MTC application 1005 that has been triggered. The purpose of the triggering, for example, a software upgrade, may be a value that is transparent to the MTC device/WTRU 1010.

When the MTC device/WTRU 1010 receives a triggering message 1040 including a device trigger (DT), the MTC device/WTRU 1010 may store 1045 the DT and start a timer. The timer may be set to a maximum delayed response time value or a value based on the maximum delayed response time value, for example, a maximum delayed response time value−n DRX cycle. Alternatively, the timer may be set to a random number selected from a value between 0 and the maximum delayed response time value. When the WTRU transitions to an RRC connected mode 1050, for example, after the timer expires, the WTRU may dispatch 1055 the DT to the MTC application 1005. The MTC application 1005 may establish 1060 an IP connection with the MTC server 1025 if a response is requested.

Figure 11:
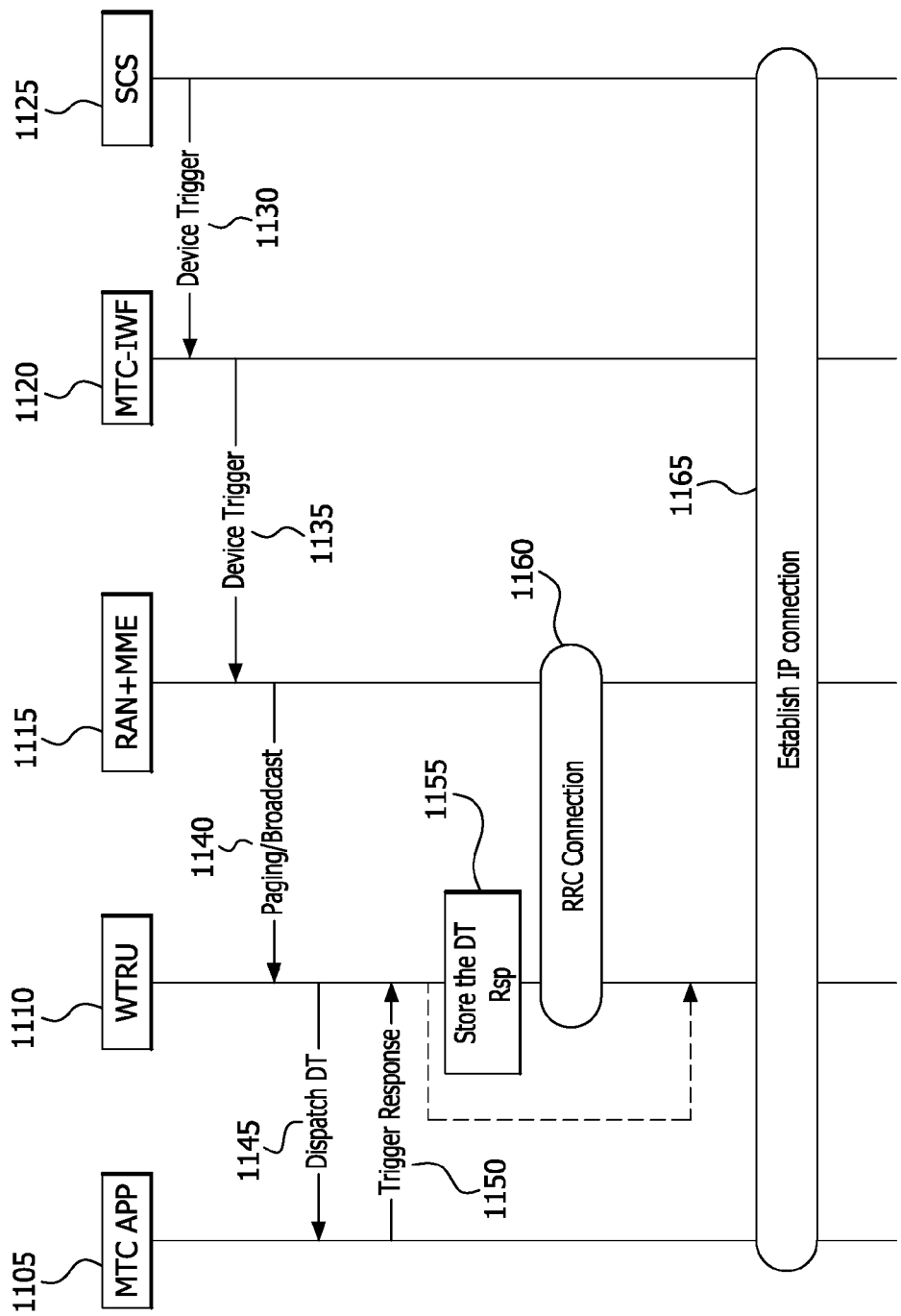
FIG. 11 shows that an MTC device/WTRU may delay a response message transmitted by an MTC application.

FIG. 11 shows that the MTC device/WTRU may delay the response message transmitted by an MTC application. FIG. 11 includes an MTC application 1105, an MTC device/WTRU 1110, a RAN+MME 1115, an MTC-IWF 1120 and an SCS 1125. A device trigger 1130 is transmitted from SCS 1125 to MTC-IWF 1120. The device trigger 1135 is forwarded to the RAN+MME 1115. When the MTC device/WTRU 1110 receives the triggering message 1140, it may dispatch 1145 it to the MTC application 1105. The MTC application 1105 may choose to transmit a trigger response message 1150, in which the MTC application 1105 may specify the maximum delay that the trigger response message may tolerate. The MTC device/WTRU 1110 may store 1155 the trigger response message if it is in idle mode. The MTC device/WTRU 1110 may start a timer based on the maximum delay value, for example, a maximum delay–n DRX cycle. When the timer expires, the MTC device/WTRU 1110 may trigger the establishment of an RRC connection 1160, establish an IP connection 1165 between the MTC application 1105 and the SCS 1125, and forward the triggering response message to the SCS 1125. Alternatively, when the MTC device/WTRU 1110 transitions to the RRC connected mode, for example, after the timer expires, the MTC device/WTRU 1110 may then establish the IP connection between the MTC application 1105 and the SCS 1125, and forward the triggering response message to the SCS 1125.

The MTC device trigger response may be an NAS message at the MM level. The response message may be transmitted as an independent NAS message in response to the trigger if the device/WTRU is in a connected state. The MTC device trigger response may also be a first MM level message after the RRC connection has been established, for example, to transmit the service request, such as an extended service request, and the trigger response message together in the RRC connection setup complete message as the "DedicatedInfoNAS" component, if the device is in "online" state but no RRC connection. If the device/WTRU is in the "offline" state, the response message, as the first NAS message, may serve for both the attach and the trigger response.

For the dual purpose message, for example, the extended service request+trigger response or the attach+trigger response, the necessary elements of the service-request or the attach-request may need to be put together with the MTC device trigger response elements to serve the dual purpose.

FIG. 12 shows an example of the message format of dual purpose MTC device service or attach+trigger response message. FIG. 12 includes IEI 1205, an information element 1210, a type/reference of the information element 1215, presence of the information element 1220, format of the information element 1225, and length of the information element 1230. The information elements contained in the dual purpose MTC device service or attach+trigger response message may be protocol discriminator 1210(*a*), MTC service message identity 1210(*b*), MTC response type 1210(*c*), MTC trigger response ID 1210(*d*), MTC response details 1210(*e*), MTC cause 1210(*f*), and authentication response parameter 1210(*g*).

To avoid excessive authentication/security overhead, authentication response parameters may be added in the trigger response message, when the message is transmitted as the first NAS message after RRC connection establishments. To help the network to distinguish whether user plane EPS bearers may need to be established or not upon receiving the MTC trigger response included in the first NAS message extended-service request, an indicator of flag may be added to the combined message, such as an EPS bearer type. The indicator or flag may indicate whether the user plane EPS bearers, in addition to the C-plane bearer, may need to be established or not for this trigger response. The network may be able to derive from one or the MTC response parameters, for example the MTC trigger response type, the MTC trigger response ID or the MTC cause.

FIG. 13 shows an example extended-service request message content. FIG. 13 includes IEI 1305, an information element 1310, a type/reference of the information element 1315, presence of the information element 1320, format of the information element 1325, and length of the information element 1330. The information elements contained in the extended-service request message may be protocol discriminator 1310(*a*), security header type 1310(*b*), extended service request message ID 1310(*c*), service type 1310(*d*), NAS key set ID 1310(*e*), M-TMSI 1310(*f*), CSFB response 1310 (*g*), EPS bearer context status 1310(*h*), device properties 1310 (*i*), device properties 1310(*j*), EPS bearer type 1310(*k*), MTC response type, 1310(*l*), MTC trigger response ID 1310(*m*), MTC response details 1310(*n*), MTC cause 1310 (*o*), and authentication response parameter 1310(*p*).

The information elements for the MTC device trigger response may include one or more of the following: the MTC trigger response type 1310(*l*), which may include a simple ACK, a combined ACK, and a NACK, and the like, the MTC trigger response ID 1310(*m*) assigned in the MTC trigger request for associate the response to the request, MTC response details 1310(*n*) from the MTC application, MTC-cause 1310(*o*) for the MTC-response-type value NACK.

FIG. 14 shows an example bit map that defines a cause value. The bit value 000001 1405 may represent that the Requested Application does not exist. The bit value 000010 1410 may represent that the Requested Application does not respond. The bit value 000100 1415 may represent low battery. The bit value 001000 1420 may represent not enough memory. The bit value 010000 1425 may represent other.

If the WTRU has several MTC applications, the following situations may exist and need to be handled: the WTRU is Idle and no MTC application is active. When a WTRU is connected and at least one MTC device is active, a non-active MTC application may be triggered. When the WTRU has multiple MTC applications and it is in a connected mode with any non-MTC application running, or one of the MTC applications is active, then the active application path may be used to trigger the MTC device. The SCS may include/encapsulate the MTC device trigger message in the application data, for example, through the user-plane triggering path and method. When the active MTC application or an MTC handling entity receives that trigger message it may perform the device trigger procedure and transmit the appropriate reply. This trigger message may include some of the information elements described above.

A WTRU/user may need to register with the network and with operators to receive services that require registration. This registration is described as network attachment. The WTRU registers its presence to the network in the registration area of the chosen cell if necessary by means of a location registration (LR), LTE attach, GPRS attach, IMSI attach procedure or combined attach procedures. For example, in the case of LTE, in the state EMM-deregistered, no EMM context has been established and the WTRU location is unknown to an MME and therefore it is unreachable by an MME. In order to establish an EMM context, the WTRU may start the attach or combined attach procedure.

An offline MTC device is a device/WTRU that is unattached to the network, for example, the device is not registered with the network. It may also have been registered with the network but then may be de-registered with the network, for example, with some timer and monitoring function remaining, in order to save power.

Figure 15:
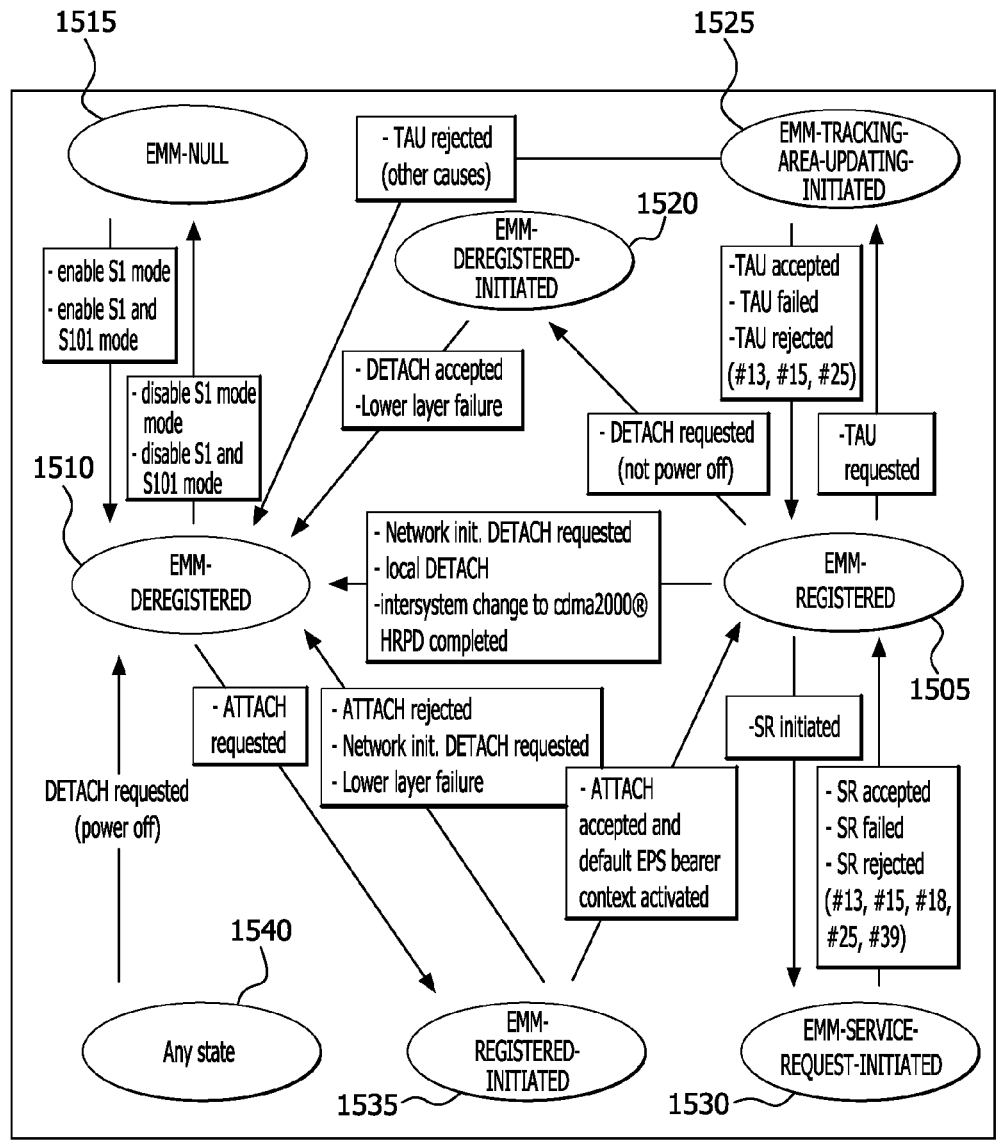
FIG. 15 shows the primary EMM states in an MTC device/WTRU.

FIG. 15 shows the primary EMM states in an MTC device/WTRU. The MTC device/WTRU may be in any one of 7 states: EMM-Registered 1505, EMM-Deregistered 1510, EMM-Null 1515, EMM-Deregistered-Initiated 1520, EMM-Tracking-Area-Updating-Initiated 1525, EMM-Service-Request-Initiated 1530, and EMM-Registered-Initiated 1535.

For example, as shown in FIG. 15, an offline MTC device/WTRU may be in an EMM-deregistered state 1510 or in an EMM-null state 1515. When the MTC device/WTRU transitions from a EMM-registered state 1505 to the EMM-deregistered state 1510, the MTC device/WTRU may communicate to the network with information to help the network reach the MTC device/WTRU or trigger the MTC device/WTRU to transition it from an offline state to an online state and/or to perform certain commanded actions by MTC device server/application. For example, an online state may be when the WTRU is again attached to the network at trigger response.

In another embodiment, when the device is transitioning from a state where the device is not registered 1510 to the network to a state where the device is registered 1505 to the network, the MTC device may communicate to the network information to help the network reach the device or trigger the device to transition from an offline state to an online state after the device returns to an offline state or status. For example, an online state may be when the WTRU is registered to the network.

In another embodiment, another terminal device or network element may provide the offline triggering support parameters to the network. For example, in a local network, the LGW or the H(e)NB or any other MTC device aggregator node may store locally these parameters and provide them to the rest of the network either upon request or autonomously based on configurable triggers. For example, a network element, such as a home network element, may store locally these parameters and provide them to another network, such as a visited network or another equivalent PLMN or another shared network, upon request or autonomously based on configurable triggers.

A certain portion of MTC devices may have an attribute that they may be attached/registered to the network and perform data transfer for a short period of time and go back to un-attached/de-registered state (i.e., the offline MTC device) via "de-registration" or other procedures for a longer period of time for power-saving and other purpose while remaining alert to receive network MTC device trigger/reach signals. MTC devices with the above offline attribute may notify the network with the attribute and the information enabling the network to trigger/reach them. The network may know and be able to handle the "offline" devices in terms of device triggering/reaching. The MTC devices/WTRUs may transmit the information using one or more NAS messages or a combination of RRC message together with a RAN interface message, for example, a combination of RRC message+S1-AP or radio access network application part (RANAP) message. The information provided to the network may include one or more of the following.

The MTC device/WTRU may provide its "offline" attribute to the network via NAS messages such as an ATTACH message or the NAS area update message or a detach message. For example, the NAS area update message may be a tracking area update (TAU). The MTC device/WTRU may provide the device roaming area information to the network in the NAS procedures (or messages) at EMM (or MM) level such as the detach procedure, the attach procedure, or the TAU/LAU/RAU procedures. For example the detach procedures may be a detach request message, the attach procedures may be an attach request message, and the TAU/LAU/RAU procedures may be a tracking area update request message.

The information, for example, parameters, provided by the MTC device to the network may be a list of tracking areas, location areas, routing areas, or a list of cells identified, for example, by their global identifier. Such list may be a subset from a super list provided by the network to the WTRU during a prior information exchange between the MTC device and the network. Such list may be based on prior areas visited by the MTC device or registered by the MTC device. The roaming area information may also be one single area or a fixed location attribute, such as no roam/mobility.

The MTC devices may provide their device trigger/reaching monitoring occasion information to the network. For MTC, the network may define or provide a specific set of monitoring schedules, timer values, or DRX/sleep cycle lengths and the device may indicate which one or more of the schedules it follows when it goes offline. The device may choose to transmit its monitoring schedule explicitly in the message before it goes offline. If there is more than one MTC monitoring mechanism, such as paging vs. CBS vs. multicast, the MTC device may also need to indicate which one or more than one is supported/used.

The validity of the information provided by the WTRU to the network for the purpose of offline triggering may be controlled by a timer. The timer value may be "infinity until waived by the device or by administration." Upon expiry of such a timer, the network may purge all such information from its database and consider the offline MTC device not reachable. Alternatively, the MTC device may be configured to connect to the network and refresh the network with its reachability information before or upon expiry of the timer.

The MME or SGSN or any equivalent CN node with NAS protocol capability may receive and process the messages containing the above MTC device offline and trigger/reaching information. The function that makes the determination of whether or not a device is "offline (and reachable)" may be located in the MME (or SGSN or GGSN/S-GW/PGW), in the HSS (or HLR), in the MTC-IWF, in the SCS, or in the MTC application inside or outside the 3GPP network.

The device reachability information may be propagated from the MME to the network node where the function of offline status determination is located, such as in the MTC-IWF. For example, the device reachability information may be parameters of location, triggering mechanism, and scheduling. Alternatively, the MTC-IWF, upon receiving a request from the MTC server, may query the HSS (HLR) in a scheme where the HSS is responsible for keeping track of the device status together with the information on how to reach the device when offline. The MTC-IWF may subsequently ask the MME to trigger the device.

Alternatively, the SCS may contact the SMS-SC, which in turn queries the HSS for the device status. Alternatively, once a determination is made that a device is offline, such status may be conveyed to the MTC-IWF or SCS of the MTC application. Alternatively, the device may be offline but not reachable, for example, the reachability information provided by the MTC device to the network has expired. When the device is offline and previously reachable becomes unreachable, such information may be propagated back to the SCS of the MTC-IWF.

Various procedures may be implemented to identify WTRUs of a certain priority, or identify applications for WTRUs that have different priorities. This may be applicable when a WTRU has an emergency bearer service or is requesting an emergency bearer service. The terminology "priority WTRU" may refer to any combination of the following: a high priority user/WTRU, a WTRU that belongs to a specific access class, for example, 11-15, or a WTRU having at least one priority application. Moreover, the terminology "priority application" may refer to an application that is known to carry priority content, a PDN connection that is associated with a known APN that provides high priority content/packet/application, an application, PDN connection, or a dedicated bearer (PDP context) that has, or requests, a known quality of service (QoS).

A WTRU profile may contain information indicating whether a particular WTRU is a priority WTRU or runs a priority application. The WTRU may be provided with information about being a priority WTRU via open mobile alliance (OMA) device management (DM) or other NAS messages. The WTRU may also have such information preconfigured. The WTRU may always include such information in all NAS messages, including mobility and session management messages, or RRC messages. The WTRU may also always indicate if the access made from idle mode is performed with access class 11-15 or any other access class. Additionally, an eNB may indicate to the MME, in all S1AP messages, the set of classes that the eNB is allowing for access.

The network may include this information in all NAS messages or RRC messages. When the RRC in the WTRU receives such an indication, the RRC may inform the NAS about it or may pass the information to the NAS.

BO timers may be provided on a per application basis. An application ID may be introduced in NAS messages in order to identify the referenced application. A WTRU that receives a BO timer for an application may not transmit any NAS messages due to requests from the application to which a BO was assigned. The WTRU may stop such a timer if the network initiates session management requests for bearers/PDN connections used by this application. An application may be associated with a PDN connection mapping or a bearer mapping. The mappings may be performed via an identification that points out such an association. This identification may be part of all NAS messages. For example, all NAS messages may include an application ID and an association ID that maps the application to a specific bearer. Alternatively, the application ID may be used as the association parameter that maps the application to a particular bearer. BO timers may also be provided on a per bearer basis.

The CN nodes may exchange this indication. Further more this indication may be on a per application basis. Also, the CN nodes may exchange information about whether the WTRU in question is allowed to be a priority WTRU or have priority applications.

When a WTRU receives an indication that it is a priority WTRU or when it already has such information, for example, due to configuration, the WTRU may transmit mobility and session management messages that are not related to emergency calls, even if the WTRU has an emergency call. The WTRU may transmit a NAS message to update the network with the new priority level. The WTRU may be allowed to transmit mobility and/or session management messages that are due to requests from applications that are high priority only. The WTRU may further include indications that a particular request is for a high priority application. The WTRU may also transmit requests due to low priority applications and may indicate that the request is due to a low priority application. The WTRU may request the modification of certain bearers such that they are treated as bearers pertaining to a high priority WTRU/application or non-high priority, depending on the current WTRU/application priority. For example, if the current priority for a WTRU/application is high, then the WTRU may indicate as such in its request for modifying the bearers. If the priority for the WTRU is low, then the WTRU may request modifications indicating a non-high priority WTRU.

The above may be provided via RRC messages to the eNB/RNC. In this case, the eNB/RNC may forward such indication/information to the core network nodes via new/existing messages with new/existing information elements (IEs).

The following are network (eNB/RNC/MME/SGSN or MSC/VLR) actions when the network receives an indication about the WTRU's priority or priority of applications. This may be received in the form of NAS messages or S1AP/RANAP messages (or any similar messages).

The network may use this indication/information to accept requests regardless if they are not for emergency calls. For example, if the MME receives a request, (NAS mobility or session management message), with an indication that the WTRU/application is a low priority, then the MME may provide a BO timer to the WTRU. The BO timer may be per APN or per application. As another example, if the MME receives a request from a WTRU that indicates high priority, the MME may accept the request and process it.

The network may modify the bearers for the WTRU. For example, the MME may indicate to the S-GW to modify the bearers of the WTRU, for example, using the bearer modification request. The S-GW may also in turn request the PDN GW to modify the bearers for the WTRU. The modification may be such that the QoS/treatment/priority of the connection is improved or degraded, depending on the indication received. For example, if the MME receives an indication about the WTRU being a high priority WTRU, for example, an indication downloaded from an HSS or received from the WTRU, then the MME may indicate to the S-GW that the WTRU's bearers may be treated as those pertaining to a priority WTRU. This may be achieved via a new or existing IE in the messages exchanged between the MME and the S-GW.

The same methodology may also apply for the S-GW indication towards the PDN GW. A reverse indication may also apply, for example, the PDN GW may provide the S-GW/MME with an indication about a change in the WTRU's priority, or application priority. This may be performed by transmitting a message towards the S-GW, which in turn may transmit a message with such an indication towards the MME. The MME may then take the actions defined above. Alternatively, the MME may use this indication to modify the bearers for the WTRU and may therefore transmit NAS messages to the WTRU to indicate the change of priority of the WTRU. The MME may also inform the eNB that the WTRU priority has changed, for example, using S1AP messages similar to a WTRU context modification request. The eNB may, upon receipt of an indication of a change in WTRU priority, execute an RRC reconfiguration procedure to implement the change in WTRU priority.

The network, (i.e., MME/SGSN/GGSN/PDN GW, or MSC/VLR), may decide to provide a BO timer to the WTRU, for example, if the indication is from a low priority WTRU or from a WTRU that does not indicate high priority. Furthermore, the network may decide to stop any existing BO timers that are running for a WTRU/application that indicates high priority.

The above procedures may be applicable to both LTE and GERAN/UTRAN, and to both PS and CS domains/core networks, and may be used in any combination.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method for performing machine type communication (MTC) device authentication and triggering, performed by an MTC interworking function (MTC-IWF), the method comprising:
    on a condition an Internet protocol (IP) connection does not exist between a services capability server (SCS) and an MTC device, receiving from the SCS over a Tsp interface, a device trigger message towards the MTC device, wherein the device trigger message includes a cryptographic key and the device trigger message has an associated level of urgency;
    determining a level of network congestion;
    transmitting the device trigger message, including the received cryptographic key, to the MTC device in accordance with the associated level of urgency;
    sending a report, to the SCS, associated with the determined level of network congestion, wherein the report indicates either success or failure of the device triggering; and
    establishing a secure IP connection using the received cryptographic key.

2. The method of claim 1, wherein the MTC device is configured to verify an identity of the SCS using the cryptographic key.

3. The method of claim 1, wherein the MTC device, in response to the transmitted paging message, is configured to establish an IP connection with the SCS.

4. The method of claim 1, wherein the MTC device is location fixed.

5. The method of claim 1, wherein the MTC device is a water meter.

6. A machine type communication (MTC) interworking function (MTC-IWF), comprising:
    a receiver configured to, on a condition an Internet protocol (IP) connection does not exist between a services capability server (SCS) and an MTC device, receive from the SCS over a Tsp interface, a device trigger message towards the MTC device, wherein the device trigger message includes a cryptographic key and the device trigger message has an associated level of urgency;
    circuitry configured to determine a level of network congestion;
    a transmitter configured to transmit the device trigger message, including the received cryptographic key, to the MTC device in accordance with the associated level of urgency;
    the transmitter configured to send a report, to the SCS, associated with the determined level of network congestion, wherein the report indicates either success or failure of device triggering; and
    circuitry configured to establish a secure IP connection using the received cryptographic key.

7. The MTC-IWF of claim 6, wherein the MTC device is configured to verify an identity of the SCS using the cryptographic key.

8. The MTC-IWF of claim 6, wherein the MTC device, in response to the transmitted paging message, is configured to establish an IP connection with the SCS.

9. The MTC-IWF of claim 6, wherein the MTC device is location fixed.

10. The MTC-IWF of claim 6, wherein the MTC device is a water meter.

11. A method for performing machine type communication (MTC) device authentication and triggering, performed by a services capability server (SCS), the method comprising:
    on a condition an Internet protocol (IP) connection does not exist between the SCS and an MTC device, transmitting from the SCS over a Tsp interface to an MTC interworking function (MTC-IWF), a device trigger message towards the MTC device, wherein the device trigger message includes a cryptographic key and the device triggering message has an associated level of urgency;
    wherein the MTC-IWF is configured to determine a level of network congestion and transmit the device trigger messge, including the received cryptographic key, to the MTC device in accordance with the associated level of urgency;
    receiving, from the MTC-IWF, a report associated with the determined level of network congestion, wherein the report indicates either success or failure of the device triggering; and
    establishing a secure IP connection using the transmitted cryptographic key.

12. The method of claim 11, wherein the MTC device is configured to verify an identity of the SCS using the cryptographic key.

13. The method of claim 11, wherein the MTC device, in response to the transmitted paging message, is configured to establish an IP connection with the SCS.

14. The method of claim 11, wherein the MTC device is location fixed.

15. The method of claim 11, wherein the MTC device is a water meter.

16. A method for performing machine type communication (MTC) device authentication and triggering, performed by a services capability server (SCS), the method comprising:
- on a condition an Internet protocol (IP) connection does not exist between the SCS and an MTC device, transmitting from the SCS over a Tsp interface to an MTC interworking function (MTC-IWF), a device trigger message towards the MTC device, wherein the device trigger message includes a cryptographic key and the device trigger message has an associated level of urgency;
- wherein the MTC-IWF is configured to determine a level of network congestion and transmit the device trigger message, including the received cryptographic key, to the MTC device in accordance with the associated level of urgency;
- receiving, from the MTC-IWF, a report associated with the determined level of network congestion, wherein the report indicates either success or failure of the device triggering; and
- establishing a secure IP connection using the transmitted cryptographic key.

17. The method of claim 16, wherein the MTC device is configured to verify an identity of the SCS using the cryptographic key.

18. The method of claim 16, wherein the MTC device, in response to the transmitted paging message, is configured to establish an IP connection with the SCS.

19. The method of claim 16, wherein the MTC device is location fixed.

20. The method of claim 16, wherein the MTC device is a water meter.

* * * * *